(12) United States Patent
Albright et al.

(10) Patent No.: US 10,156,067 B2
(45) Date of Patent: Dec. 18, 2018

(54) BUILDING FRAMING SYSTEM

(71) Applicant: CLEMSON UNIVERSITY, Clemson, SC (US)

(72) Inventors: Dustin Graham Albright, Clemson, SC (US); Vincent Yves-Marie Blouin, Central, SC (US); Daniel Nevin Harding, Clemson, SC (US); David Aaron Pastre, Charleston, SC (US); Ulrike Ann-Sophie Heine, Pendleton, SC (US); Ufuk Ersoy, Central, SC (US); Ty Monks, Bozeman, MT (US); Anthony Wohlers, Greenville, SC (US); Michael Stoner, Aiken, SC (US); Eric Balogh, Atlanta, GA (US); Tyler Silvers, Clemson, SC (US); Clair Dias, Winston-Salem, NC (US); Alison Martin, Clemson, SC (US); Jon Pennington, Clemson, SC (US); Jeff Hammer, Nashville, TN (US); Will Hinkley, Greenville, SC (US); Justin Hamrick, Shelby, NC (US); Alexandra Latham, Sumter, SC (US); Neely Leslie, Brooklyn, NY (US); Rodney Daniel Taylor, II, York, SC (US); David Herrero, Greenville, SC (US); Rebecca Mercer Wilson, Anderson, SC (US); Russell Buchanan, Clemson, SC (US); Amelia Brackmann, Stafford, VA (US); Paul Mosher, Clemson, SC (US); Allyson Beck, Clemson, SC (US); Alex Libengood, Charleston, SC (US)

(73) Assignee: Clemson University Research Foundation, Clemson, SC (US)

( * ) Notice: Subject to any disclaimer, the term of this patent is extended or adjusted under 35 U.S.C. 154(b) by 0 days.

(21) Appl. No.: 15/367,411

(22) Filed: Dec. 2, 2016

(65) Prior Publication Data

US 2017/0159290 A1  Jun. 8, 2017

Related U.S. Application Data

(60) Provisional application No. 62/262,576, filed on Dec. 3, 2015.

(51) Int. Cl.
*E04B 5/02* (2006.01)
*E04B 7/20* (2006.01)
(Continued)

(52) U.S. Cl.
CPC ............... *E04B 5/023* (2013.01); *E04B 1/26* (2013.01); *E04B 2/707* (2013.01); *E04B 5/14* (2013.01);
(Continued)

(58) Field of Classification Search
CPC ............. E04B 5/023; E04B 2001/2692; E04B 2001/2664; E04B 2001/2624; E04B 2001/262; E04B 2001/2672
See application file for complete search history.

(56) References Cited

U.S. PATENT DOCUMENTS

| | | | | |
|---|---|---|---|---|
| 733,500 A * | 7/1903 | Moore | ...................... | F16B 5/02 403/376 |
| 1,459,761 A * | 6/1923 | Andrews | ................... | E04B 1/26 164/DIG. 4 |

(Continued)

FOREIGN PATENT DOCUMENTS

| | | | | |
|---|---|---|---|---|
| CA | 2225846 A1 * | 9/1999 | ............... | A01G 9/16 |
| CA | 2922944 A1 * | 8/2015 | ........... | A63H 33/105 |

(Continued)

*Primary Examiner* — Adriana Figueroa
(74) *Attorney, Agent, or Firm* — Dority & Manning, P.A.

(57) ABSTRACT

A building framing system includes a floor portion or floor framing system, a wall portion or wall framing system, and a roof portion or roof framing system. Each framing system (Continued)

comprises a plurality of components. Each component defines a connection geometry for connecting one component to another. The connection geometries are such that mechanical or other similar fasteners are not required to hold the various components together; rather, the connection geometries connect the components and hold them in place with respect to one another. Further, the framing systems utilize pre-cut components such that the components of each framing system arrive onsite cut to a needed length and width and with the appropriate connection geometry.

17 Claims, 23 Drawing Sheets

(51) Int. Cl.
 E04B 7/02 (2006.01)
 E04B 1/26 (2006.01)
 E04B 2/70 (2006.01)
 E04B 5/14 (2006.01)

(52) U.S. Cl.
 CPC ............... E04B 7/026 (2013.01); E04B 7/20 (2013.01); *E04B 2001/262* (2013.01); *E04B 2001/2624* (2013.01); *E04B 2001/2664* (2013.01); *E04B 2001/2672* (2013.01); *E04B 2001/2692* (2013.01); *E04B 2001/2696* (2013.01)

(56) References Cited

U.S. PATENT DOCUMENTS

| | | | | |
|---|---|---|---|---|
| 3,206,903 A * | 9/1965 | Johnson | .................... | E04B 1/26 52/276 |
| 3,902,291 A * | 9/1975 | Zucht | .................... | G09B 25/04 403/381 |
| 4,047,357 A * | 9/1977 | Mulholland | .............. | E04B 7/20 52/309.4 |
| 5,036,634 A * | 8/1991 | Lessard | ................. | E04H 1/1205 446/105 |
| 5,293,725 A * | 3/1994 | Matticks | ............. | E04B 1/34315 52/126.1 |
| 5,323,584 A * | 6/1994 | Scarlett | ...................... | E04C 3/14 403/381 |
| 6,761,009 B1 * | 7/2004 | Karlstrom | ............ | B27M 3/0053 144/355 |
| 7,225,594 B2 * | 6/2007 | Karlstrom | ............... | E04C 3/122 144/330 |
| 7,775,014 B2 * | 8/2010 | Karlstrom | ............. | E04B 2/7453 52/841 |
| 8,281,529 B2 * | 10/2012 | Cluff | .......................... | E04B 1/26 52/271 |
| 2002/0178669 A1 * | 12/2002 | Harambasic | .............. | E04B 1/04 52/264 |
| 2007/0227095 A1 * | 10/2007 | Hubbe | .................... | E04B 2/707 52/653.1 |
| 2014/0053481 A1 * | 2/2014 | Leahy | ................. | E04B 1/34321 52/270 |
| 2016/0032581 A1 * | 2/2016 | Sklar | .................... | A63H 33/084 52/220.8 |
| 2016/0348369 A1 * | 12/2016 | Godfrey | .................... | E04C 3/36 |

FOREIGN PATENT DOCUMENTS

| | | | | |
|---|---|---|---|---|
| DE | 3512306 A1 * | 10/1986 | ............... | E04B 1/26 |
| EP | 3219865 A1 * | 9/2017 | | |
| FR | 2799243 A1 * | 4/2001 | ........... | E04B 1/2604 |
| FR | 3000116 A1 * | 6/2014 | ............. | E04B 2/707 |
| WO | WO-2007042031 A2 * | 4/2007 | ............. | E04C 2/386 |
| WO | WO-2010037871 * | 4/2010 | | |
| WO | WO-2012083391 A1 * | 6/2012 | ................ | E04B 1/18 |
| WO | WO-2015011300 A1 * | 1/2015 | ................ | E04B 1/26 |

\* cited by examiner

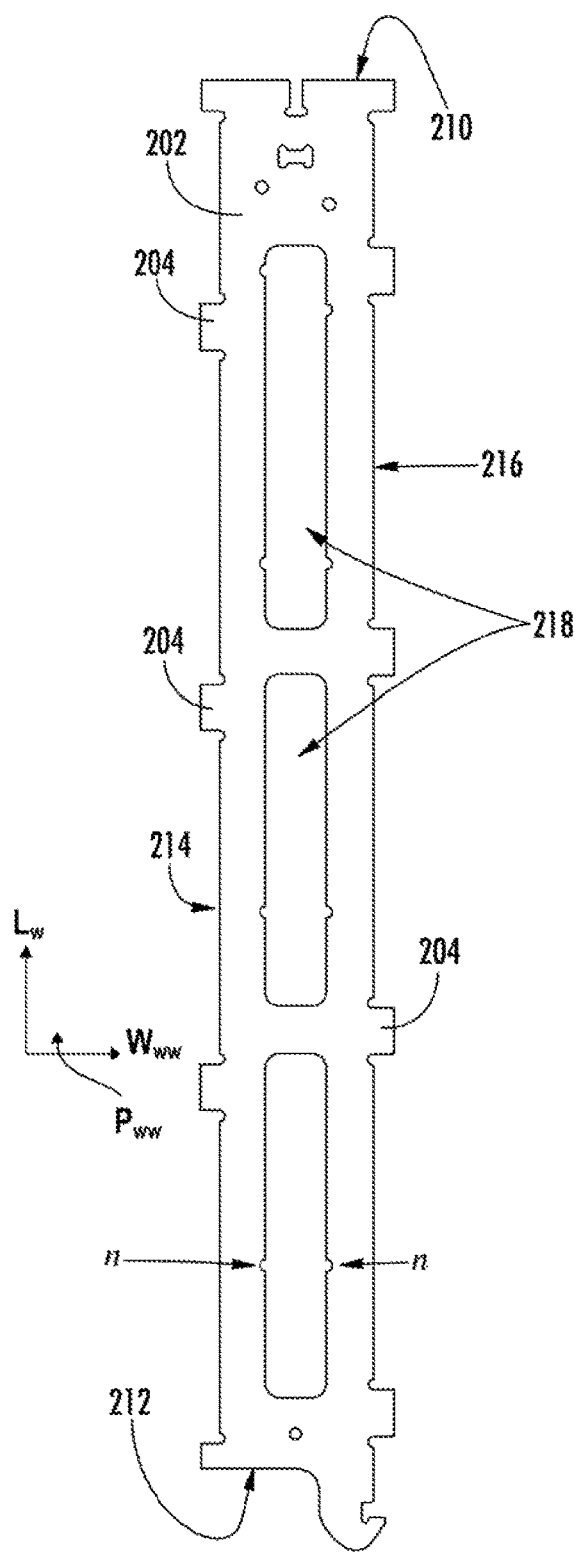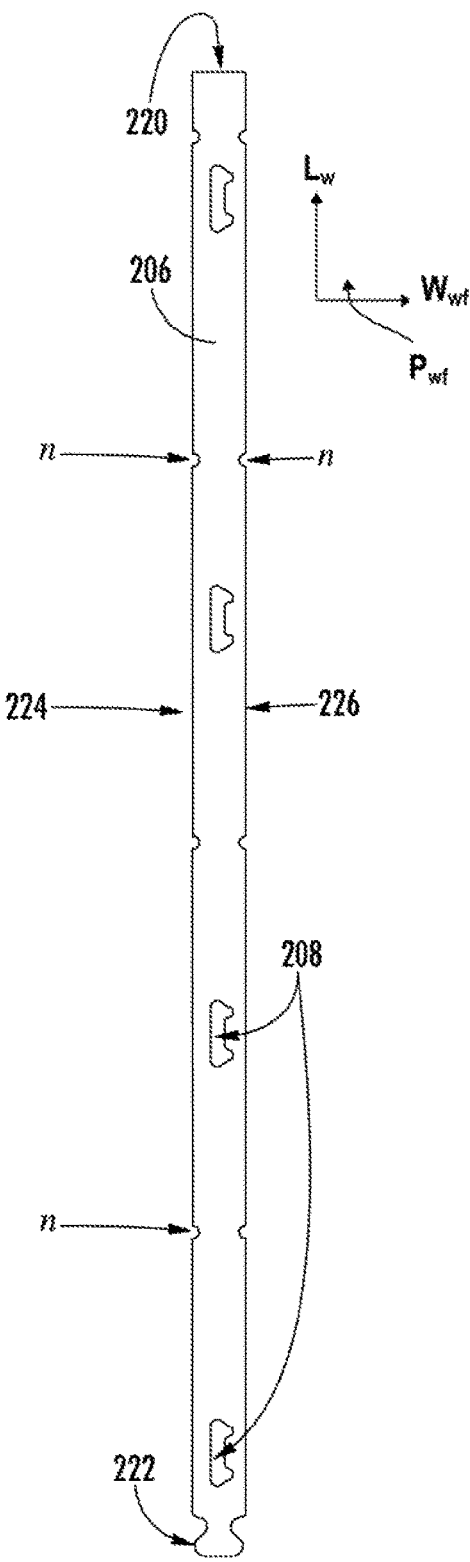
FIG. 5
FIG. 6

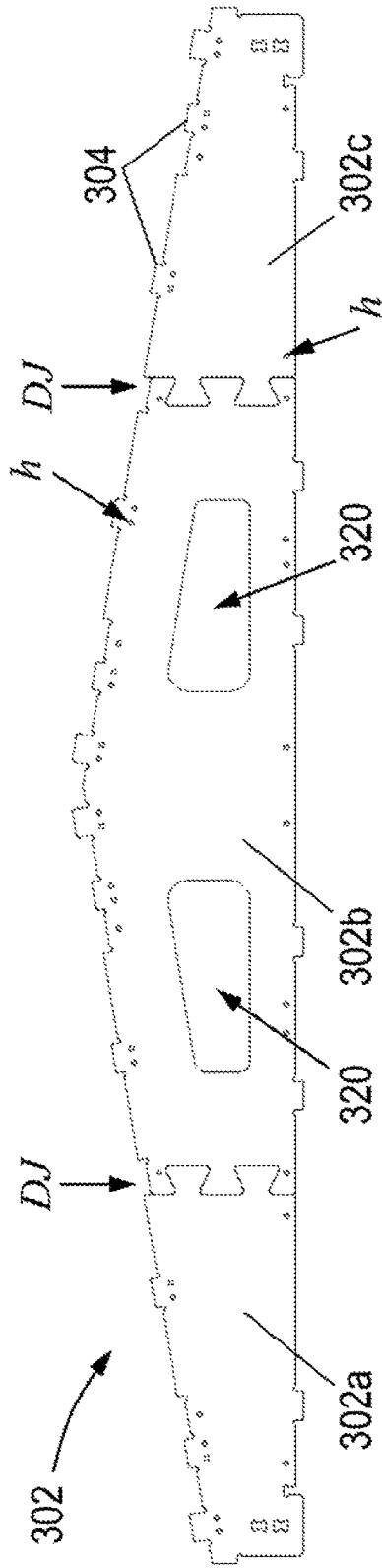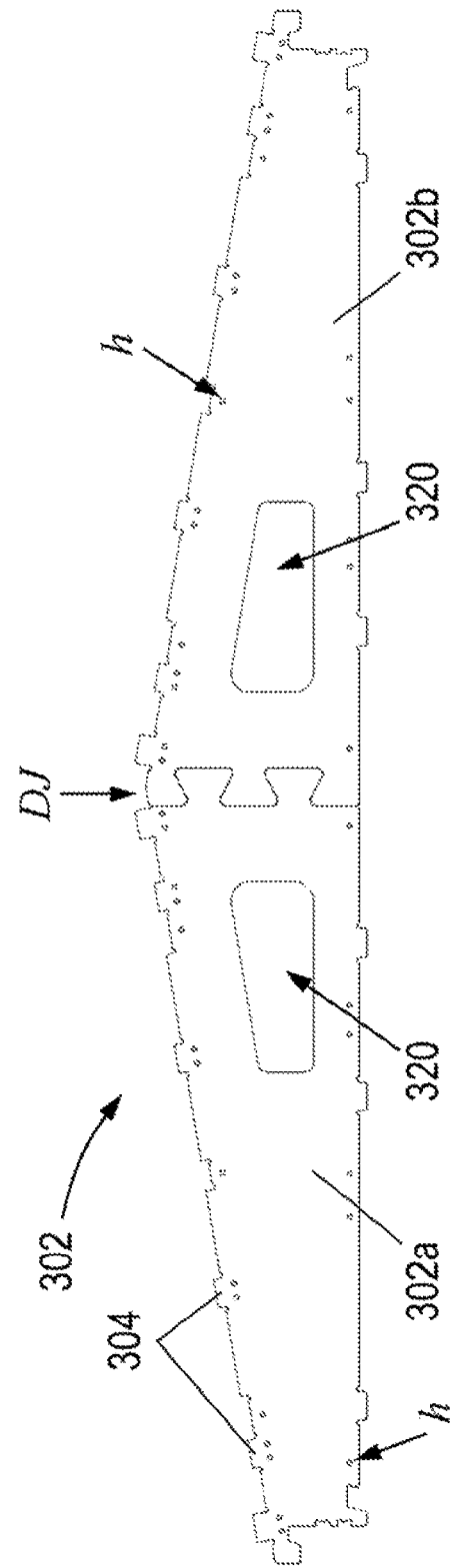
FIG. 10
FIG. 11

BUILDING FRAMING SYSTEM

CROSS-REFERENCE TO RELATED APPLICATIONS

The present application claims priority to U.S. Provisional Application Ser. No. 62/262,576, filed on Dec. 3, 2015, which is incorporated herein in its entirety by reference thereto.

FEDERAL RESEARCH STATEMENT

This invention was made with government support under grant #DE-EE0006559 awarded by The Department of Energy. The government has certain rights in the invention.

FIELD OF THE INVENTION

The present invention generally involves a system for framing buildings. In particular embodiments, the system may comprise a floor portion, a wall portion, and a roof portion. In other embodiments, a floor framing system, a wall framing system, and a roof framing system may be provided.

BACKGROUND OF THE INVENTION

For many years, light wood framing has been a dominant construction technique for small structures, such as detached housing and the like. Typical building framing systems utilize dimensional lumber and standard mechanical fasteners such as nails and screws. Light wood framing techniques usually involve cutting the lumber onsite to needed sizes, which requires cutting tools and often requires a certain amount of skill. Further, assembling a light wood frame generally requires lifting heavy wall sections into place, which then must be braced, and roofs of light wood frames may require large trusses that must be set in place by using a machine lift. Moreover, light wood framing typically requires the use of mechanical or other similar fasteners to connect the various components of the frame. As such, the fasteners and tools for fastening the fasteners, such as hammers, nail guns, and the like, must be provided. Each of these conditions can increase the cost—including materials and labor—of construction and decrease the safety of the construction site.

Accordingly, a need exists for an improved building framing system that may overcome one or more disadvantages of existing systems. For example, an improved system may comprise three portions or systems including components that connect or attach to one another using certain geometries rather than mechanical fasteners. Alternately, or in addition, an improved system may utilize pre-cut components such that the components of the framing system arrive onsite cut to a needed length and width and with the appropriate connection geometry.

BRIEF DESCRIPTION OF THE INVENTION

Aspects and advantages of the invention are set forth below in the following description, or may be obvious from the description, or may be learned through practice of the invention.

In one aspect, the present subject matter is directed to a building framing system. The building framing system comprises a plurality of first components, each of the first components defining a first connection geometry; and a plurality of second components, each of the second components defining a second connection geometry. The first connection geometry joins with the second connection geometry to connect adjacent first and second components such that mechanical fasteners are not required to attach a first component to an adjacent second component.

In another aspect, the present subject matter is directed to a building framing system. The building framing system comprises a floor portion, a wall portion, and a roof portion. The floor portion includes a plurality of floor joist components and a plurality of subfloor components. Each floor joist component has a projection, and each subfloor component defines a recess. At least one subfloor component is adjacent a floor joist component such that the projection of the adjacent floor joist component fits within the recess of the subfloor component. The wall portion includes a plurality of wall web components and a plurality of wall flange components. Each wall web component has a projection, and each wall flange component defines a recess. At least one wall flange component is adjacent a wall web component such that the projection of the adjacent wall web component fits within the recess of the wall flange component. The roof portion includes a plurality of roof web components and a plurality of roof flange components. Each roof web component has a projection, and each roof flange component defines a recess. At least one roof flange component is adjacent a roof web component such that the projection of the adjacent roof web component fits within the recess of the roof flange component.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 5 is an illustration of a wall web component of a wall framing system according to an exemplary embodiment of the present subject matter.

FIG. 6 is an illustration of a wall flange component of a wall framing system according to an exemplary embodiment of the present subject matter.

FIG. 10 is an illustration of a roof web component of a roof framing system according to another exemplary embodiment of the present subject matter.

FIG. 11 is an illustration of a roof web component of a roof framing system according to another exemplary embodiment of the present subject matter.

DETAILED DESCRIPTION OF THE INVENTION

Figure 1:
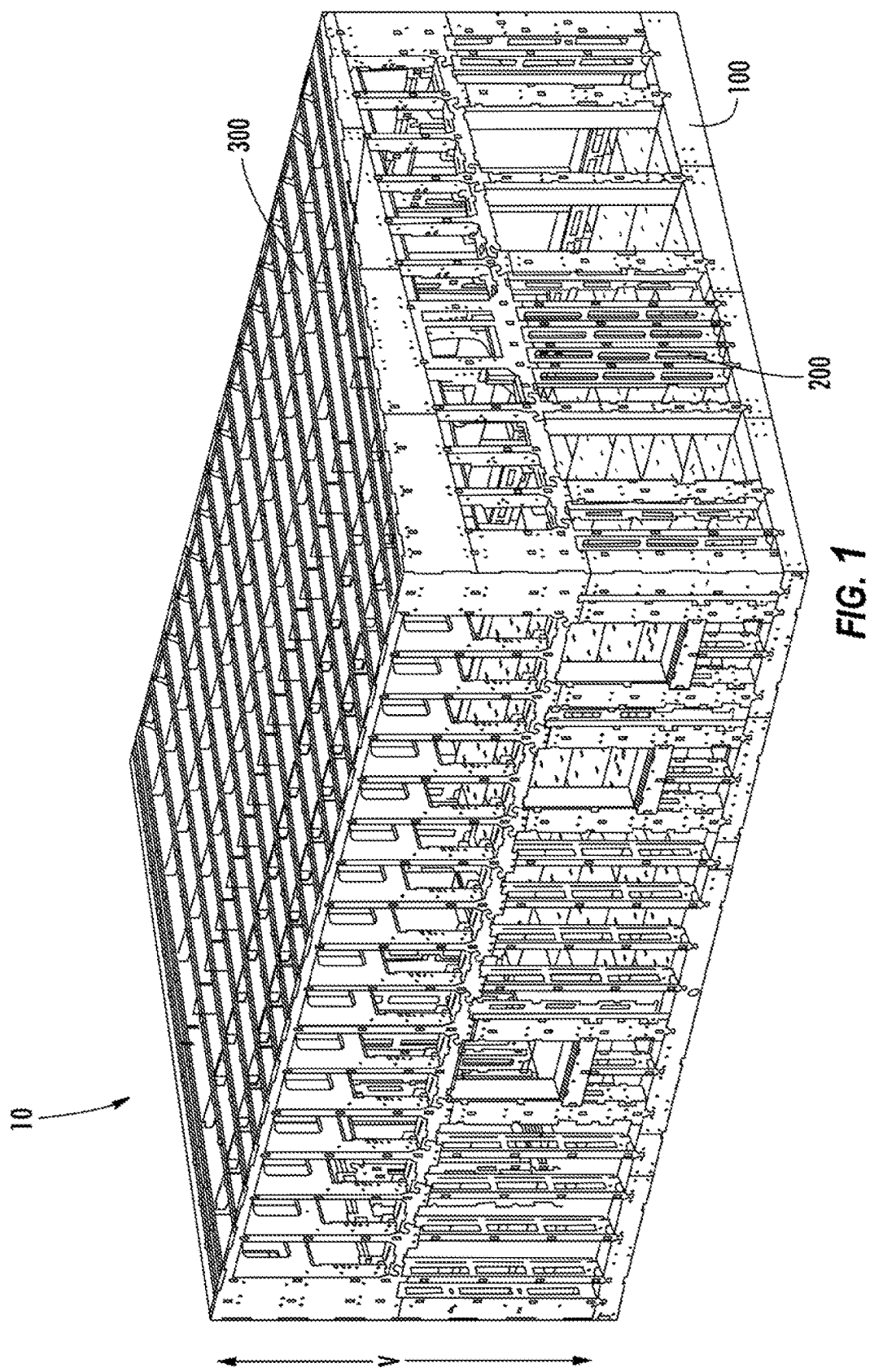
FIG. 1 is a perspective view of a building framing system according to an exemplary embodiment of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components.

Each example is provided by way of explanation of the invention, not limitation of the invention. In fact, it will be apparent to those skilled in the art that modifications and variations can be made to embodiments of the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Embodiments of the present subject matter include a building framing system. Various embodiments of the system provide a floor framing system, a wall framing system, and a roof framing system. Each framing system comprises a plurality of components, each component defining a connection geometry for connecting one component to another. The connection geometries are such that mechanical or other similar fasteners are not required to hold the various components together; rather, the connection geometries connect the components and hold them in place with respect to one another.

FIG. 1 provides a perspective view of a building framing system 10 according to one embodiment of the present invention. As shown in FIG. 1, building framing system 10 generally includes a floor portion 100, a wall portion 200, and a roof portion 300. In alternative embodiments, each portion—floor 100, wall 200, and roof 300—may comprise a separate system and may be referred to as floor framing system 100, wall framing system 200, and roof framing system 300, respectively. Moreover, for ease of reference, each portion simply may be referred to as floor 100, wall 200, and roof 300, whether the portion is being described as a part of building framing system 10 or a separate system.

Figure 2:
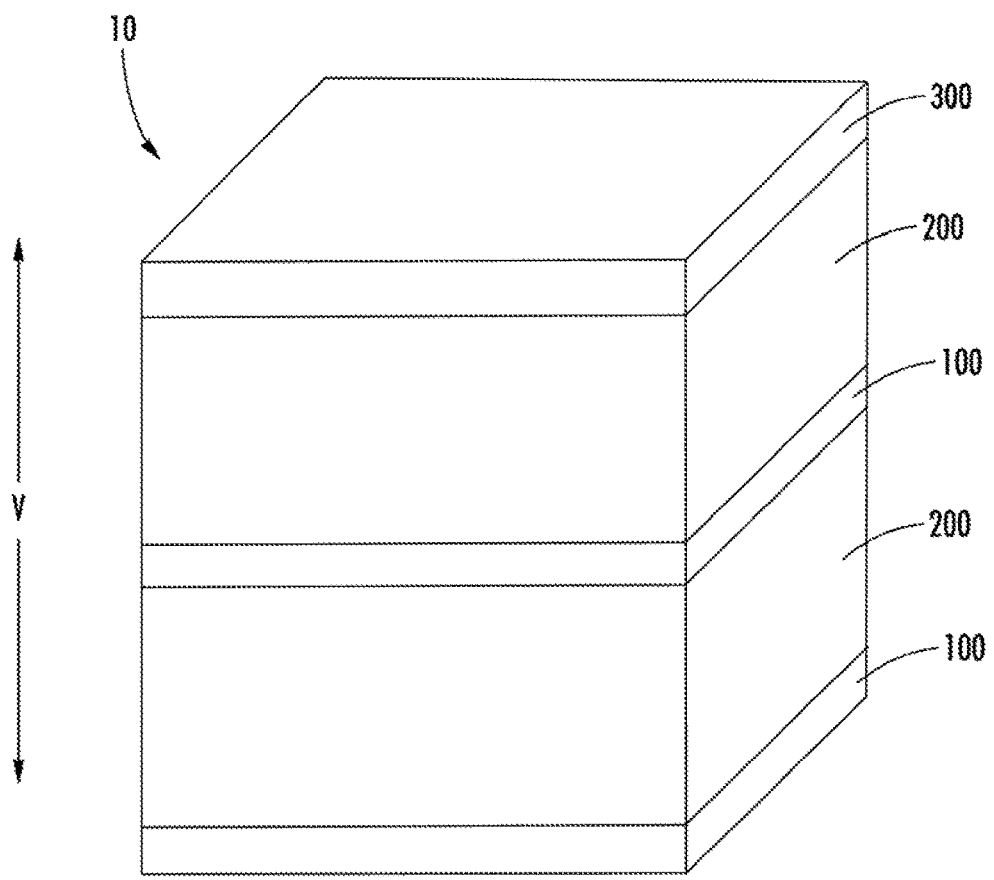
FIG. 2 is a schematic view of a building framing system according to another embodiment of the present subject matter.
Figure 3:
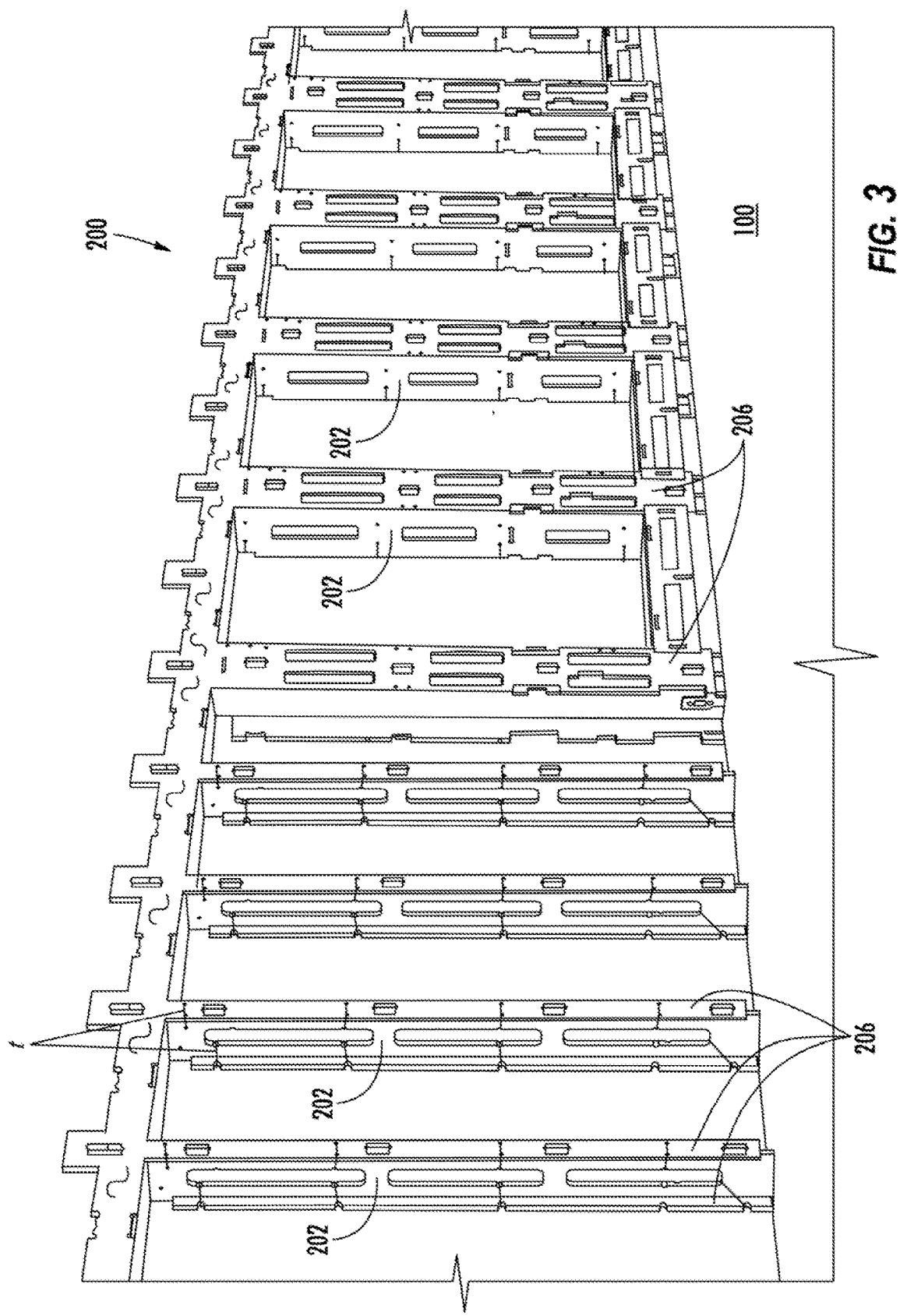
FIG. 3 is a perspective view of a portion of a wall framing system according to an exemplary embodiment of the present subject matter.

Further, it will be understood through the description provided herein that in various embodiments of the present subject matter, the various portions of building framing system 10 may be used separately or in various combinations. For example, in one embodiment, floor 100 and wall 200 may be used together, without including roof 300. Rather, in such embodiment, a different roof or roofing system, or no roof or roofing system as appropriate, may be used with floor 100 and wall 200. As another example, depicted schematically in FIG. 2, two floor portions or systems 100 and two wall portions or systems 200 may be used with one roof portion or system 300. As illustrated in FIG. 2, in such embodiment, floor portions 100 may be alternated with wall portions 200 along a vertical direction V, ending with a roof portion 300 as the vertically uppermost portion of the building framing system 10.

Referring now to FIGS. 3-22, each portion of building framing system 10 will be described in greater detail. Referring particularly to FIGS. 3 through 6, wall 200 includes a plurality of wall web components 202. Each wall web 202 has at least one projection 204, which is a first connection geometry. Projections 204 have a defined or particular shape for joining the components of wall 200, as described herein. Further, wall 200 comprises a plurality of wall flange components 206. Each wall flange 206 defines at least one recess 208, which is a second connection geometry. Recesses 208 are configured for receipt of projections 204, i.e., the first connection geometry joins with the second connection geometry to connect adjacent wall webs 202 and wall flanges 206. For example, in wall 200 shown in FIG. 3, at least one wall flange 206 is adjacent a wall web 202 such that a projection 204 of wall web 202 fits within a recess 208 of wall flange 206.

As shown in FIG. 5, each wall web 202 has a first edge 210 opposite a second edge 212 and a third edge 214 opposite a fourth edge 216. More particularly, in the depicted embodiment, first edge 210 and second edge 212 are spaced apart along a length direction L and third edge 214 and fourth edge 216 are spaced apart along a width direction W. Four projections 204 are defined along third edge 214 and three projections 204 are defined along fourth edge 216. Moreover, web 202 defines three apertures 218, the apertures spaced apart from one another along the length direction L. By removing material to form or define apertures 218, a weight of web 202 can be reduced. Also, apertures 218 provide a space or area through which other elements of the building can pass, e.g., a space through which electrical wiring, plumbing, and the like can be routed. As also depicted in FIG. 5, web 202 defines a plurality of notches n, each notch n defined adjacent an aperture 218 such that notches n are spaced apart from edges 210, 212, 214, 216. Additionally, wall web 202 defines a plane $P_{ww}$, such that each of the foregoing elements of web 202—e.g., edges 210, 212, 214, 216, notches n, apertures 218, and projections 204—lie within or are parallel to plane $P_{ww}$.

As further shown in the exemplary embodiment of FIG. 6, each wall flange 206 has a first edge 220 opposite a second edge 222 and a third edge 224 opposite a fourth edge 226. First edge 220 and second edge 222 are spaced apart along the length direction L and third edge 224 and fourth edge 226 are spaced apart along the width direction W. A plurality of notches n are defined along third edge 224 and fourth edge 226. In the depicted embodiment, flange 206 defines four recesses 208 between edges 220, 222, 224, 226 and one recess 208 along third edge 224. Moreover, wall flange 206 defines a plane $P_{wf}$, such that each of the foregoing elements of flange 206—e.g., edges 220, 222, 224, 226, notches n, and recesses 208—lie within or are parallel to plane $P_{wf}$.

Figure 7A:
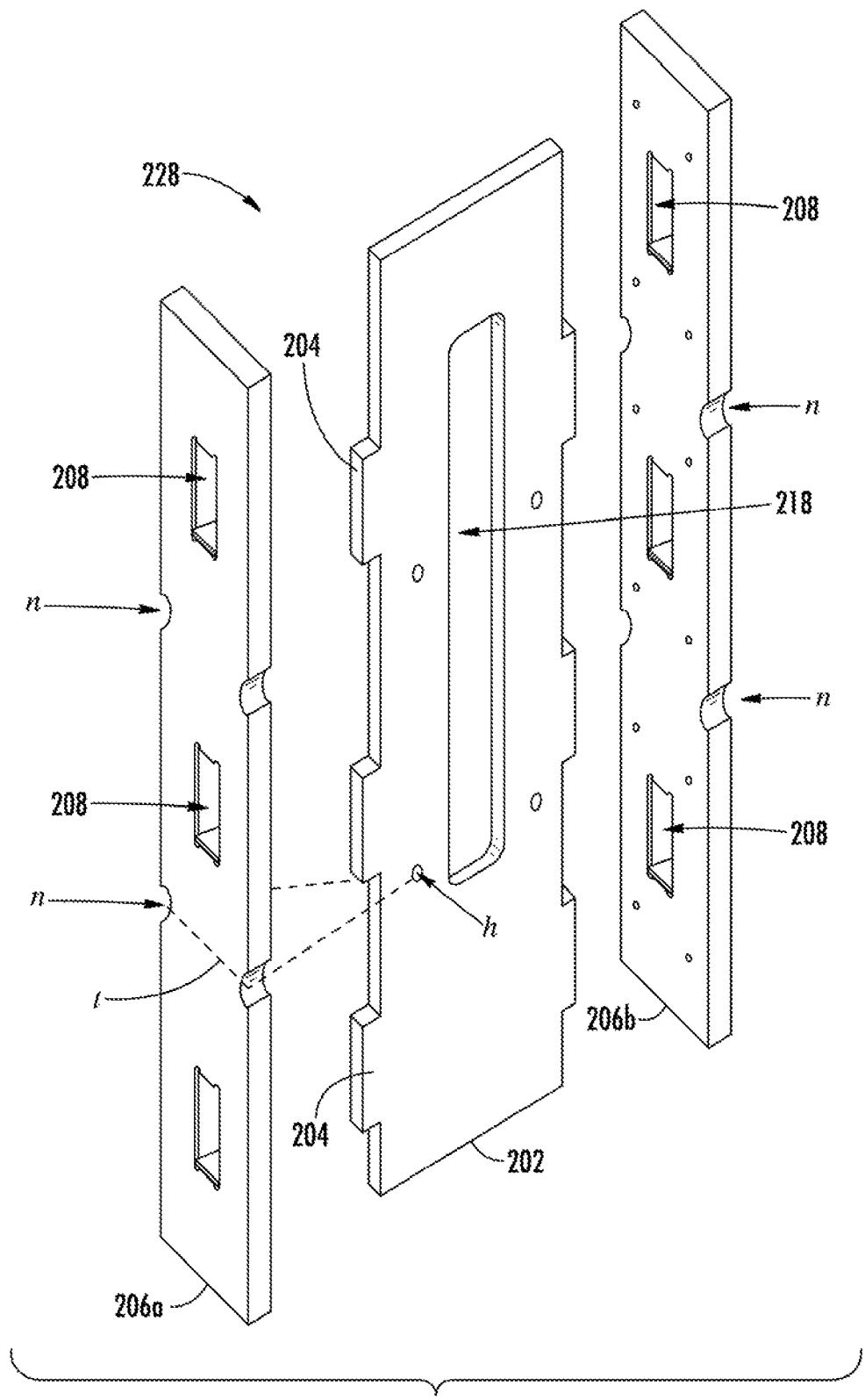
FIG. 7A is an illustration of a wall stud of a wall framing system according to an exemplary embodiment of the present subject matter.

Referring to FIG. 7A, wall system 200 is comprised of a plurality of studs 228. Each stud 228 includes a wall web 202 and two flanges 206, where one flange 206 is positioned adjacent third edge 214 of web 202 and the other flange 206 is positioned adjacent fourth edge 216 of web 202. The plane $P_{wf}$ defined by each flange 206 is oriented perpendicularly to plane $P_{ww}$ defined by web 202. Accordingly, projections 204 defined along third and fourth edges 214, 216 of web 202 fit within recesses 208 of flanges 206 to attach web 202 and flange 206. As such, mortise and tenon joints are formed between attached webs 202 and flanges 206. The mortise and tenon joints formed by the projection connection geometry and recess connection geometry do not require mechanical fasteners to attach the wall webs 202 to adjacent flanges 206. Further, one of ordinary skill in the art will appreciate that any appropriate number of projections 204 and recesses 208 may be used to attach webs 202 and flanges 206.

Figure 4:
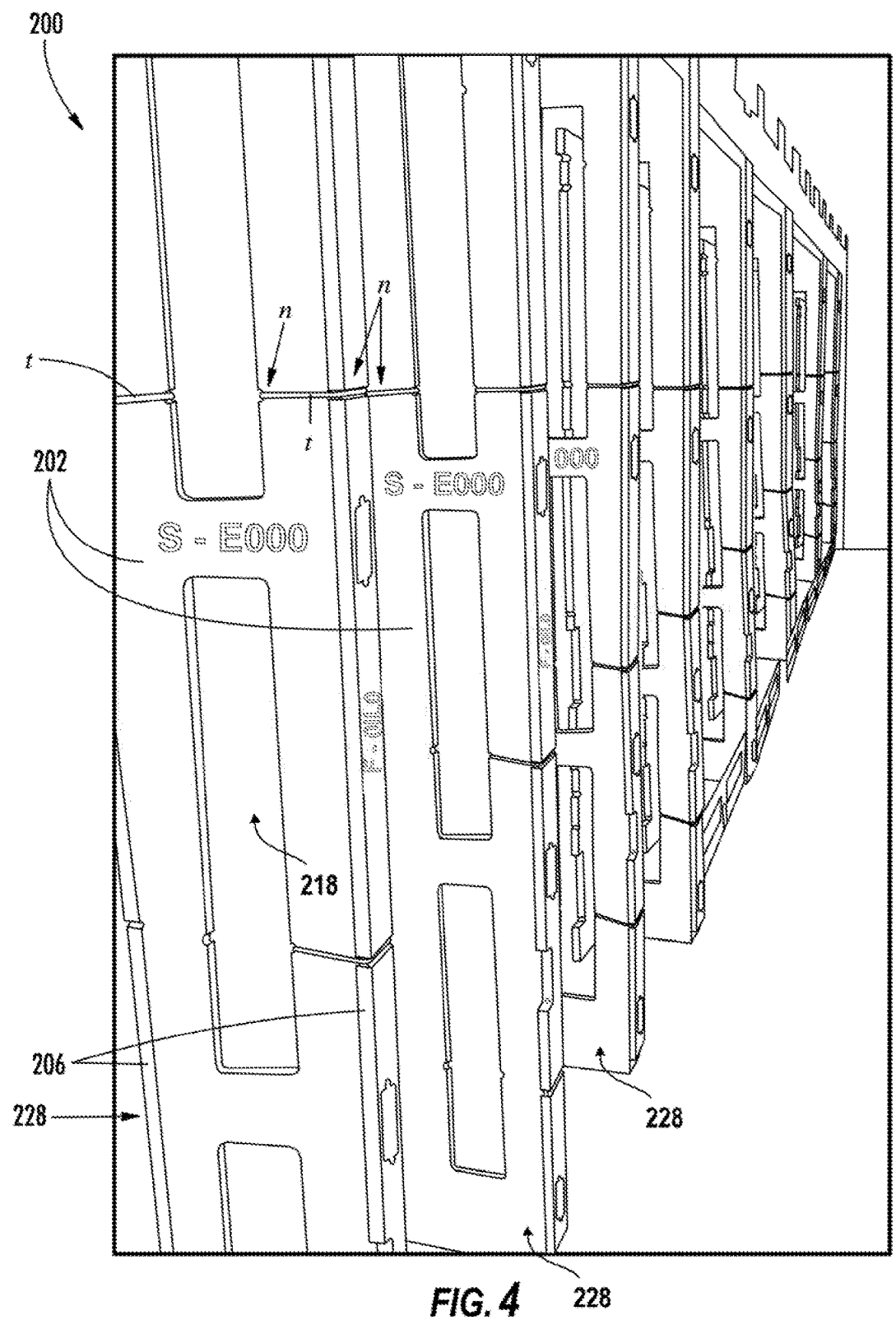
FIG. 4 is a side perspective view of the portion of the wall framing system of FIG. 3.

As further shown in FIG. 4, a notch n defined in web 202 may be adjacent or near one or more notches n defined in flanges 206. A tie component t, such as a cable or zip tie made from a metal such as steel or the like, may be positioned within adjacent notches n of web 202 and a flange 206 and then fastened together to hold the web 202 and respective flange 206 in place with respect to one another, e.g., such that web 202 and flanges 206 do not slip or the mortise and tenon joints formed by web 202 and flanges 206 do not separate during assembly of the building framing system 10, including as wall 200 is constructed and/or moved into position with respect to floor 100. In other embodiments, for example as shown in FIG. 7A, one or more holes h may be used in place of notch n in web 202 and/or notch n in flange 206. In the embodiment of FIG. 7A, tie t passes through a hole h in web 202 and is positioned within notches n in flange 206 and fastened together to hold web 202 and flange 206 in place with respect to each other. Holes h preferably are spaced inward from edges 210, 212, 214, 216 of web 202 or edges 220, 222, 224, 226 of flange 206, i.e., holes h are not defined close to an edge of a web 202 or a flange 206. It will be understood that other configurations of notches n, holes h, and ties t may be used as well.

Figure 7B:
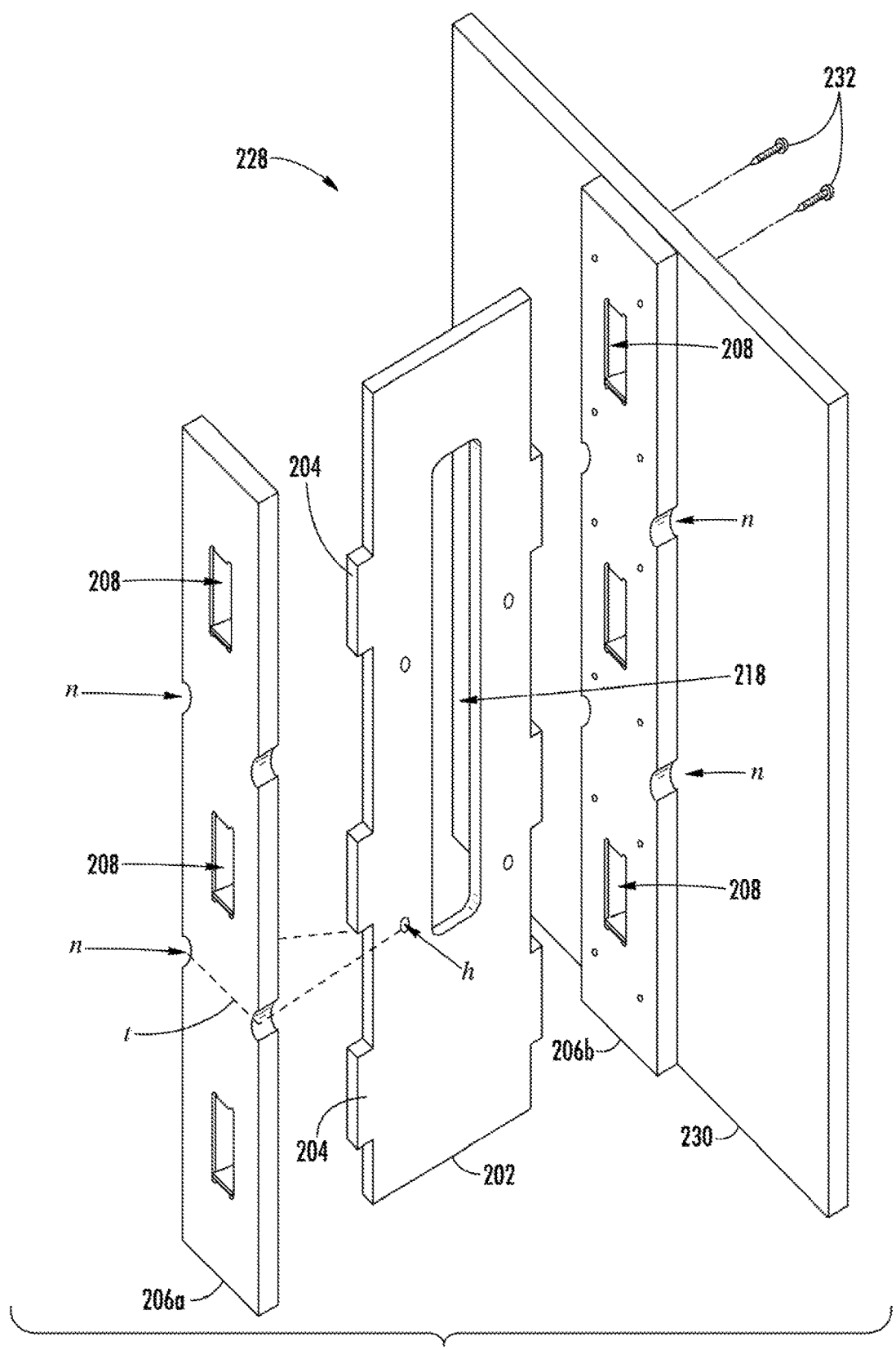
FIG. 7B is an illustration of a use of an outer wall flange of a wall framing system according to an exemplary embodiment of the present subject matter.

FIG. 7B illustrates one use or purpose of flanges 206. As previously described with respect to FIG. 7A and as further depicted in FIG. 4, each stud 228 comprises two flanges 206 oriented perpendicularly to web 202. These flanges may be described as an interior flange 206a and an exterior flange 206b. As shown in FIG. 7B, the orientation of flanges 206a and 206b provides a surface for attaching exterior and interior finish materials, e.g., exterior sheathing 230 may be attached to exterior flange 206b using mechanical fasteners such as screws 232 or other suitable fasteners. Similarly, interior finish materials, e.g., a suitable interior wall finish material such as drywall or plywood, may be attached to interior flange 206a using mechanical or other appropriate fasteners. As described more particularly below, the components of wall system 200 preferably are fabricated or made from structural plywood. Mechanical fasteners inserted through the edge of plywood can split the plywood or tear out of the plywood. By providing flanges 206a, 206b substantially parallel to finish materials such as exterior sheathing 230, mechanical fasteners can pass through the face of plywood flanges 206a, 206b rather than the edge of web 202 and thereby limit or reduce splitting the plywood with the fasteners and/or tearing out of the fasteners.

Figure 8A:
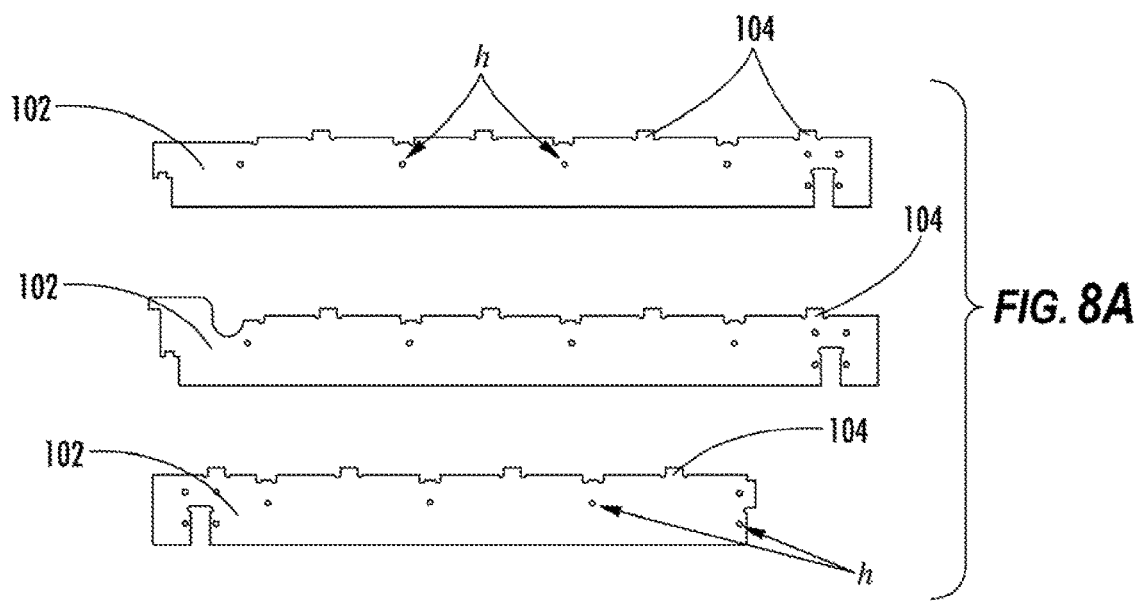
FIG. 8A is an illustration of floor joist components of a floor framing system according to an exemplary embodiment of the present subject matter.
Figure 8B:
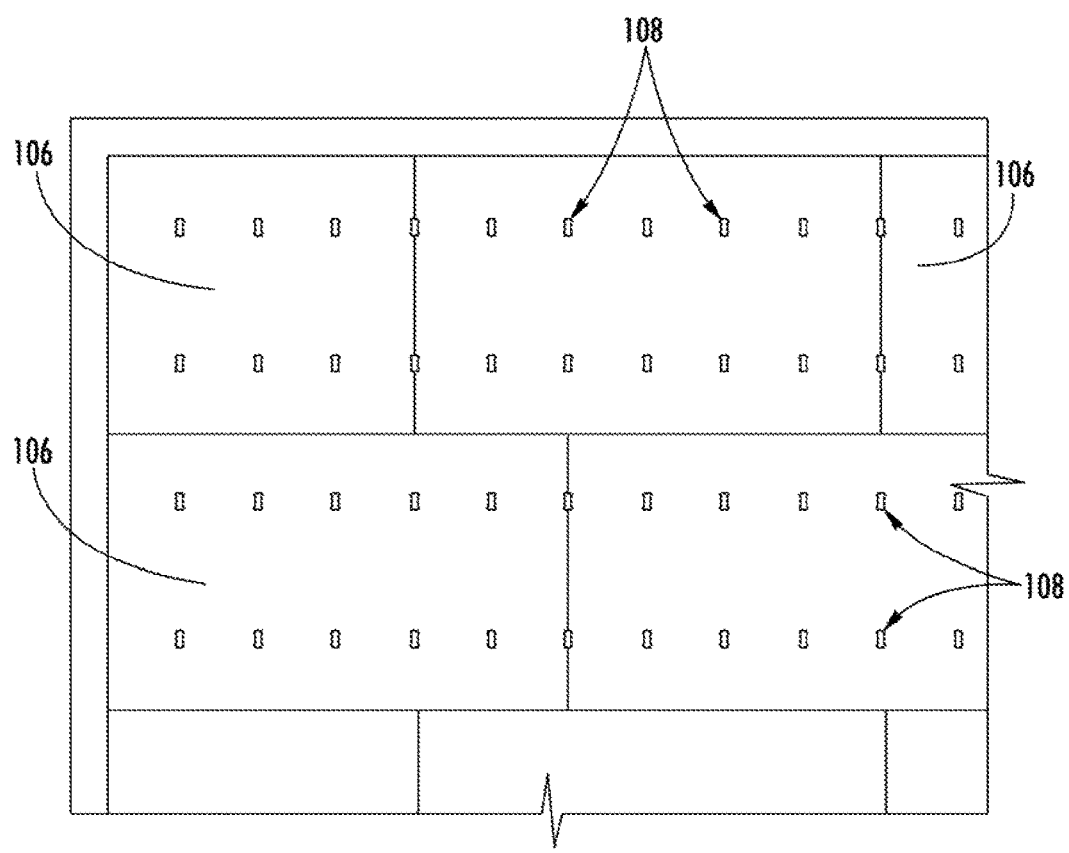
FIG. 8B is an illustration of a subfloor components of a floor framing system according to an exemplary embodiment of the present subject matter.

Referring now to FIGS. 8A and 8B, floor system 100 similarly utilizes mortise and tenon connections to attach its various components to one another. More particularly, floor 100 includes a plurality of joists 102. Each joist has at least one projection 104, which is a first connection geometry. Further, floor 100 comprises a plurality of subfloor components 106. Each subfloor component 106 includes at least one recess 108, which is a second connection geometry. Recesses 108 are configured for receipt of projections 104, i.e., the first connection geometry joins with the second connection geometry to connect adjacent floor joists 102 and subfloor components 106. Further, projections 104 have a defined or particular shape for joining floor joists 102 and subfloor components 106. For example, in floor 100, at least one subfloor component 106 is adjacent a joist 102 such that a projection 104 of joist 102 fits within a recess 108 of subfloor component 106. As such, joists 102 and subfloor components 106, having projections 104 and recesses 108, respectively, form mortise and tenon joints and fit together in much the same way as wall webs 202 and wall flanges 206. Similar to the components of wall system 200 described above, each floor joist 102 and subfloor component 106 defines a plane, and when projections 104 are received within recesses 108, the planes defined by the floor joists 102 are perpendicular to the planes defined by the subfloor components 106. Further, one of ordinary skill in the art will appreciate that any appropriate number of projections 104 and recesses 108 may be used to attach subfloor components 106 and floor joists 102.

Figure 9:
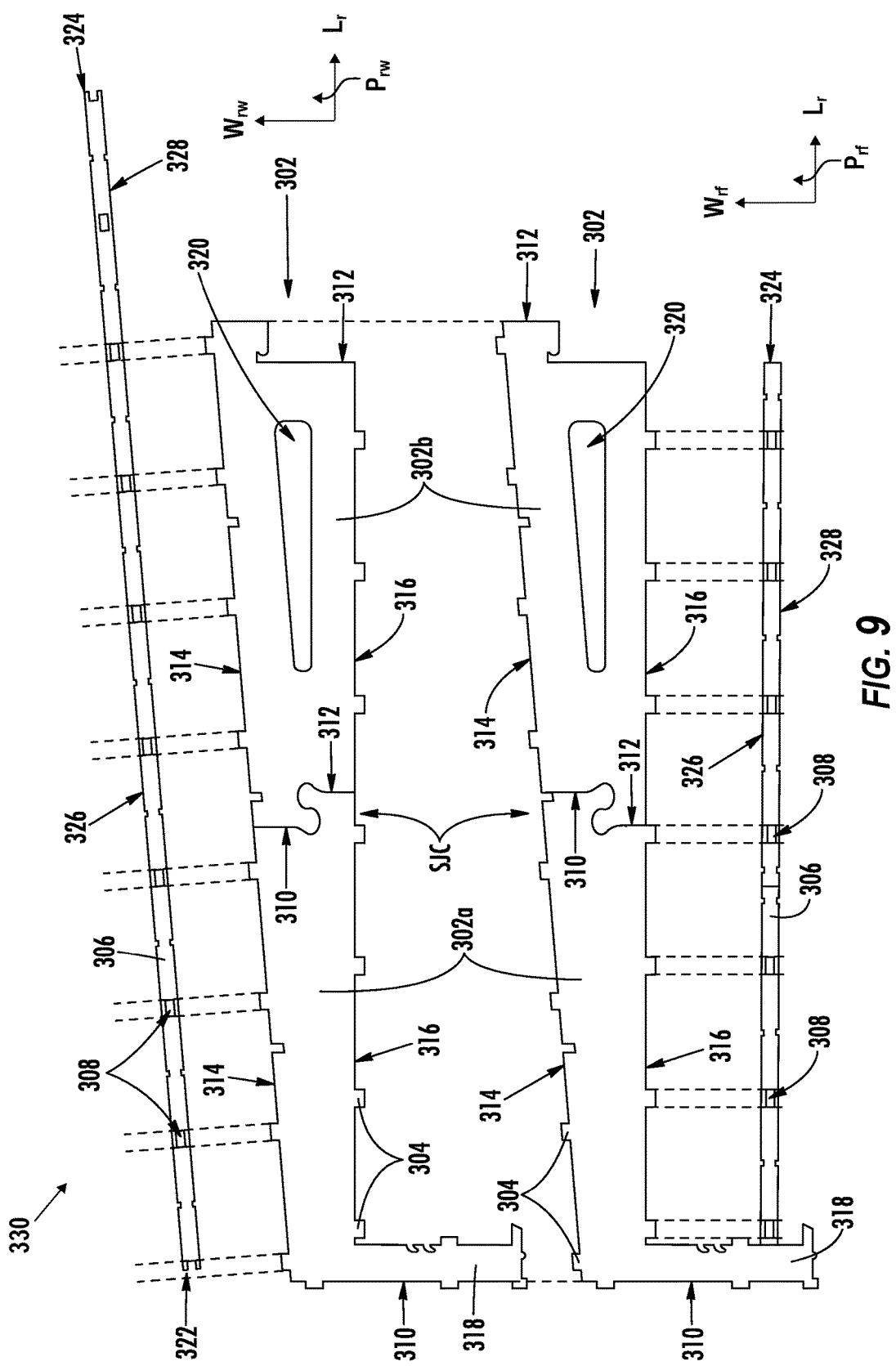
FIG. 9 is an illustration of roof web components and roof flange components of a roof framing system according to an exemplary embodiment of the present subject matter.

Turning to FIG. 9, roof 300 includes a plurality of roof web components 302. Each roof web 302 has at least one projection 304, which is a first connection geometry. Projections 304 have a defined or particular shape for joining the components of roof 300, as described herein. Further, roof 300 comprises a plurality of roof flange components 306. Each roof flange 306 defines at least one recess 308, which is a second connection geometry. Recesses 308 are configured for receipt of projections 304, i.e., the first connection geometry joins with the second connection geometry to connect adjacent roof webs 302 and roof flanges 306. For example, in roof 300, at least one roof flange 306 is adjacent a roof web 302 such that a projection 304 of roof web 302 fits within a recess 308 of roof flange 306. As previously described, such an arrangement forms mortise and tenon joints between attached webs 302 and flanges 306, which does not require mechanical fasteners to attach the webs 302 to adjacent flanges 306. Similar to the components of wall system 200 and floor system 100 described above, each roof web 302 and roof flange 306 defines a plane, and when projections 304 are received within recesses 308, the planes defined by the roof webs 302 are perpendicular to the planes defined by the roof flanges 306. Moreover, one of ordinary skill in the art will appreciate that any appropriate number of projections 304 and recesses 308 may be used to attach webs 302 and flanges 306.

Referring still to FIG. 9, each roof web 302 has a first edge 310 opposite a second edge 312 and a third edge 314 opposite a fourth edge 316. More particularly, in the depicted embodiment, first edge 310 and second edge 312 are spaced apart along a length direction L and third edge 314 and fourth edge 316 are spaced apart along a width direction W. Four projections 304 are defined along third edge 314 and four projections 304 are defined along fourth edge 316. Further, a first web 302a includes an extension 318 along first edge 310, which defines projections 304 and other features for attaching web 302 to wall system 200. A second web 302b defines a feature or connection geometry along second edge 312 for attaching web 302b to other features of roof 300. Each web 302 defines a plane $P_{rw}$ such that edges 312, 314, 316, 318 lie within plane $P_{rw}$.

Continuing with FIG. 9, first web 302a defines half of a S-joint, described in greater detail below, along its second edge 312. Second web 302b defines another half of the S-joint along its first edge 310. Connecting first web 302a and second web 302b at adjacent S-joint halves to form a full S-joint, as shown in FIG. 9, thereby extends the length of webs 302. Moreover, some webs 302, such as second web 302b, define an aperture 320. Similar to apertures 218 defined in wall webs 202, apertures 320 defined in webs 320 can reduce a weight of webs 302 and also provide a space or area through which building materials or elements, such as duct work, wiring, plumbing, and the like, can be passed or positioned.

As further shown in the exemplary embodiment of FIG. 9, each roof flange 306 has a first edge 322 opposite a second edge 324 and a third edge 326 opposite a fourth edge 328. First edge 322 and second edge 324 are spaced apart along the length direction L and third edge 326 and fourth edge 328 are spaced apart along the width direction W. Flanges 306 define a plane $P_{rf}$ such that edges 322, 324, 326, 328 lie within plane $P_{rf}$.

Roof system 300 is comprised of a plurality of rafters 330. Each rafter 330 includes two flanges 306 and two webs 302 positioned side-by-side, where the webs 302 are formed from joined first and second webs 302a, 302b. The adjacent webs 302 are positioned side-by-side such that the adjacent S-joints are oriented opposite one another, as shown in FIG. 9. Reversing the orientation of the adjacent S-joints of webs 302 helps strengthen rafters 330. Further, one flange 306 is positioned along third edge 314 of webs 302 and the other flange 306 is positioned along fourth edge 316 of webs 302. The plane $P_{rf}$ defined by each flange 306 is oriented perpendicularly to plane $P_{rw}$ defined by webs 302. Accordingly, projections 304 defined along third and fourth edges 314, 316 of web2 302 fit within recesses 308 of flanges 306 to attach webs 302 and flanges 306. As such, mortise and tenon joints are formed between attached webs 302 and flanges 306. One of ordinary skill in the art will appreciate that any appropriate number of projections 304 and recesses 308 may be used to attach webs 302 and flanges 306 and that recesses 308 of flanges 306 may be appropriately sized to receive two projections 304, one from each of the adjacent webs 302.

FIGS. 10 and 11 illustrate roof webs 302 according to other embodiments of the present subject matter. Similar to the roof webs 302 described with respect to FIG. 9, the roof web 302 depicted in FIG. 10 comprises multiple webs, namely a first web 302a, a second web 302b, and a third web 302c, and the roof web 302 depicted in FIG. 11 comprises multiple webs, namely a first web 302a and a second web 302b. However, rather than employing a S-joint to connect adjacent webs 302a, 302b and 302b, 302c, the roof webs 302 of FIGS. 10 and 11 use dovetail joints DJ to connect adjacent webs. Moreover, similar to the embodiment of FIG. 9, some webs 302, such as second web 302b in FIG. 10 and each of the first web 302a and the second web 302b in FIG. 11, define one or more apertures 320, which may reduce a weight of webs 302 and also provide a space or area through which building materials or elements, such as duct work, wiring, plumbing, and the like, can be passed or positioned. Further, each roof web 302 depicted in FIGS. 10 and 11 defines a plurality of projections 304 for receipt in recesses 308 of roof flanges 306 as previously described.

It will be readily understood that, like wall webs 202 and wall flanges 206, floor joists 102, subfloor components 106, roof webs 302, and roof flanges 306 may define notches and/or holes for the receipt of ties that help hold joists 102 and subfloor components 106 in place with respect to one another and to hold webs 302 and flanges 306 in place with respect to each other. For example, roof webs 302 may define notches n adjacent apertures 320 and/or holes h adjacent or near edges of webs 302, and roof flanges 306 may define notches n along their edges and/or holes h near or adjacent the edges. Ties t may be received or positioned within notches n and/or holes h to, when fastened, hold a web 302 and flange 306 in place with respect to one another. Similarly, floor joists 102 and subfloor components 106 may define notches n and/or holes h. Ties t may be received or positioned within notches n and/or holes h to, when fastened, hold a joist 102 and subfloor component 106 in place with respect to one another. Any appropriate number of notches n and/or holes h and ties t may be used to secure during construction the components of floor 100 in place with respect to one another, the components of wall 200 in place with respect to one another, and the components of roof 300 in place with respect to one another. It will also be appreciated that various components of floor 100, wall 200, and roof 300 may define notches n and/or holes h for the receipt of ties t to hold components of floor 100 in place with respect to wall 200 and components of wall 200 in place with respect to roof 300.

As such, ties t help the components of floor, wall, and roof systems 100, 200, and 300 resist forces that would tend to cause the components to slip or move with respect to one another during construction. Therefore, ties t help hold the components in place until the framing system or systems are structurally activated, e.g., until all connected components engage with one another. The connection geometries of the various components, rather than ties t, connect the components and structurally lock them in place with respect to one another once the system is structurally activated.

Preferably, the components of floor, wall, and roof systems 100, 200, 300 (e.g., floor joists 102, subfloor components 106, wall webs 202, wall flanges 206, roof webs 302, and roof flanges 306) are fabricated from standard sheets of plywood, e.g., four foot by eight foot (4'×8') sheets of three-quarter inch (¾") thick plywood. In exemplary embodiments, the shape of each component, including protrusions 104, 204, 304 and recesses 108, 208, 308, is produced using a computer numerical control (CNC) router. That is, control algorithms, also called cut files, are written for each different component of the floor, wall, and/or roof systems 100, 200, 300. As an example, wall 200 may include several different shaped wall web components 202. In one embodiment, wall 200 may include a wall web 202 having one projection 204 defined along one edge and two projections 204 defined along another edge; another wall web 202 having two projections 204 defined along each of two opposite edges; another wall web 202 having three projections 204 defined along one edge and two projections 204 defined along an opposite edge; and so on. Cut files may be created for each type or version of wall web 202. Then, when the components of wall 200 are fabricated, certain types or versions of web 202 may be required in varying numbers for the wall system 200, and the required cut files may be sent or delivered to the CNC router for fabricating the required number of each different version of wall web 202. Each additional component of floor 100, wall 200, and/or roof 300 may be similarly fabricated. That is, cut files may be generated for different versions of each web, flange, joist, subfloor, or other component, and the different versions required for a given floor 100, wall 200, and/or roof system 300 may be sent or delivered to a CNC router for the fabrication of the required number of each version of the component.

As such, the components of building framing system 10, including the components of floor, wall, and roof systems 100, 200, 300, may be cut from at least one sheet of a building material such as structural plywood such that each component has the needed length and width, as well as the required connection geometry, before being delivered to a construction site. That is, the required connection geometry may be pre-cut into each component. Further, each component may be numbered and/or labeled to improve efficiency and accuracy in constructing floor, wall, and roof systems 100, 200, 300. For example, the number or label for a given component may be routed into the component, as shown in FIG. 4.

Moreover, it will be appreciated that, to standardize the components and/or reduce the number of unique components, connection geometry and/or other features may be included in a component that is not needed for the actual end use of a given component. For example, an aperture for an electrical outlet may be included as part of, e.g., a template for a wall flange 206, but an electrical outlet may not be installed in every electrical outlet aperture. Reducing the number of unique components may reduce the complexity of building framing system 10, as well as any of its portions 100, 200, 300, which can improve efficiency and accuracy in constructing building framing system 10.

Plywood sheathing, or structural plywood, is a preferred material for fabricating the components of building framing system 10, including the components of floor 100, wall 200, and roof 300, because of the strength of structural plywood in view of its availability, cost, weight, and environmental impact. More particularly, structural plywood typically is a highly standardized industrial product made from laminated sheets or layers of wood veneer, where the wood grain of adjacent layers is rotated such that the wood grain alternates directions from one layer to the next. Alternating the grain direction of the layers enhances the dimensional stability of plywood, i.e., where wood tends to shrink or swell in its radial and tangential grain directions, the alternating grain directions of plywood balances and minimizes shrinkage, swelling, and warping. Also, structural plywood is inherently devoid of knots and other inconsistencies common in typical lumber boards because care is taken in the plywood manufacturing process to avoid the alignment of knots from one layer or ply to the next. Moreover, the geometries or shapes needed for each component of floor 100, wall 200, and roof 300—e.g., the shape of each projection 104, 204, 304 and recess 108, 208, 308—can be cut from structural plywood using a CNC router as described while maintaining the integrity of the plywood. As a result, plywood offers several advantages—economy, accessibility, ease of use, and strength—but it will be readily understood that other materials also may be used to fabricate the components of floor 100, walls 200, and roof 300. For example, other materials may be more readily available or better suited to a particular use of building framing system 10 and/or its portions 100, 200, 300.

Although described above with respect to a particular type of connection geometry—generally, a mortise and tenon joint formed between projections 104, 204, 304 and recesses 108, 208, 308—floor 100, wall 200, and roof 300 may use other types of connections or connection geometries as well. Referring now to FIGS. 12-28, additional types of connection geometries and/or component geometries are illustrated. It will be appreciated that, while certain connections and component geometries are described herein, other connections and component geometries may also be within the spirit and scope of the present subject matter and also may be used in building framing system 10, including floor, wall, roof systems 100, 200, 300.

Figure 12:
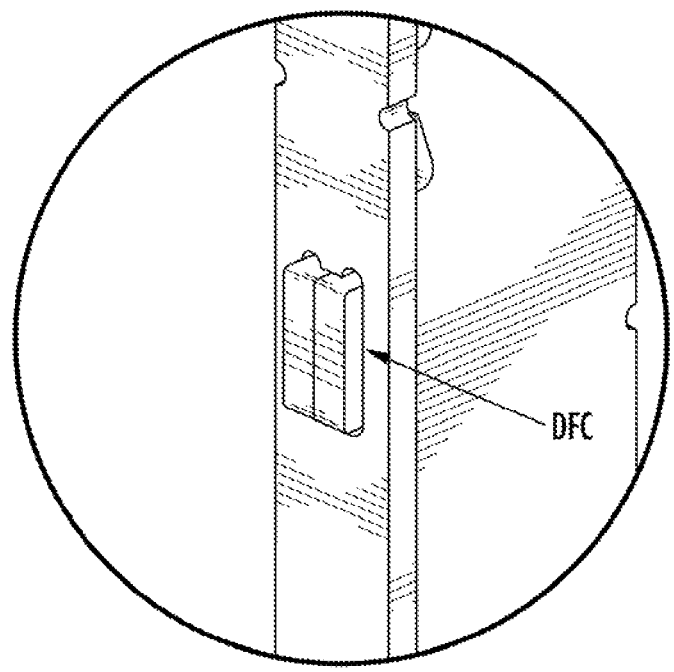
FIG. 12 is an illustration of a mortise and tenon double field connection according to an exemplary embodiment of the present subject matter.

Referring particularly to FIG. 12, one embodiment of a mortise and tenon double field connection DFC is depicted. In some embodiments of the framing systems described herein, two webs may be used side-by-side, e.g., to strengthen a portion of the frame or to provide support for a feature of the system. As an example, two wall webs 202 may be positioned side-by-side, with each web 202 defining a projection 204 that is adjacent the projection 204 of the adjacent web 202, as shown in FIG. 12. A wall flange 206 positioned adjacent the double web 202 must define a recess 208 sufficiently large to receive the two projections 204. The double field connection DFC may be used, e.g., in wall studs and roof rafters, such as studs 228 and rafters 330 described herein.

Figure 13:
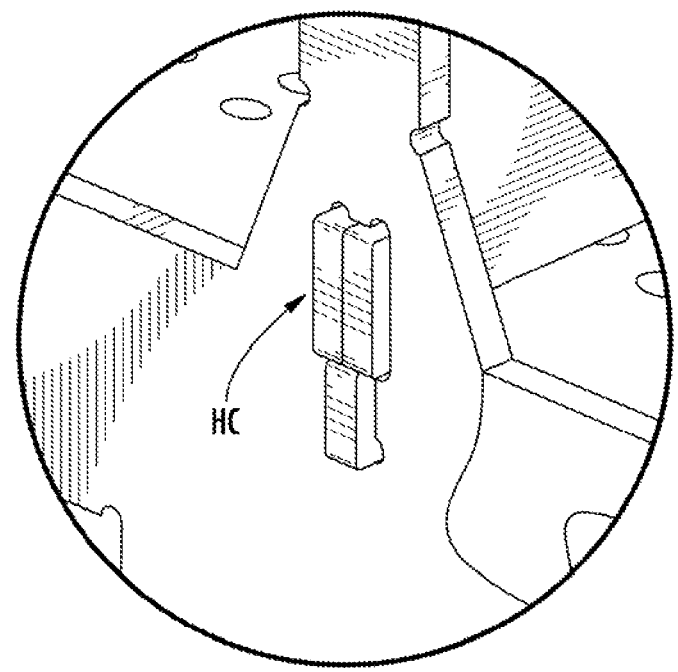
FIG. 13 is an illustration of a mortise and tenon header connection according to an exemplary embodiment of the present subject matter.

FIG. 13 illustrates a mortise and tenon header connection HC, primarily used in web-to-flange connections. As shown in FIG. 13, the recess of the flange is sufficiently large to receive multiple web projections. The mortise and tenon header connection HC may be located at or between wall studs 228 and roof rafters 330.

Figure 14:
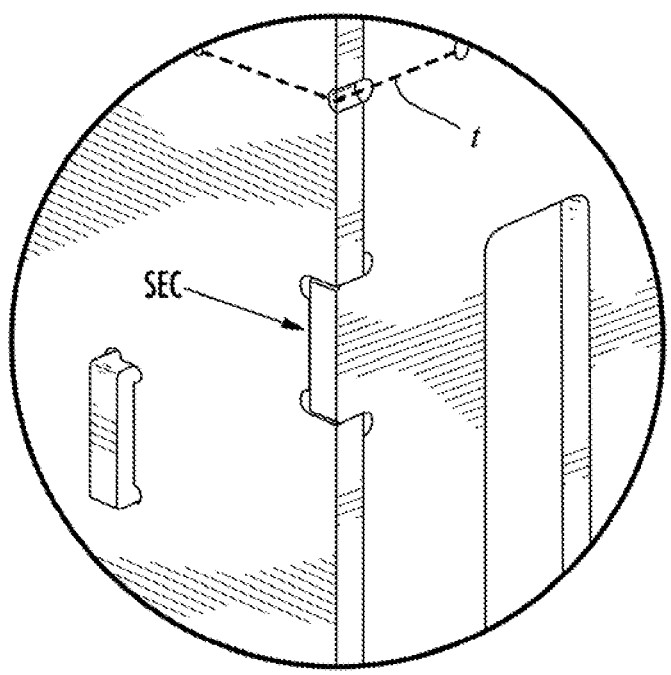
FIG. 14 is an illustration of a mortise and tenon standard edge connection according to an exemplary embodiment of the present subject matter.

Referring now to FIG. 14, one embodiment of a mortise and tenon standard edge connection SEC is depicted. It will be readily appreciated that, in some portions of the framing systems described herein, a user may desire to join framing components at right angles to each other in a manner different from the web-to-flange connections described above and shown, e.g., in FIGS. 4, 7A, and 7B, where the edges of flanges 206 extend to either side of web 202. As illustrated in FIG. 14, in the standard edge connection, a web projection fits within a flange recess such that the edge of the web having the projection is positioned adjacent the edge of the flange defining the recess. As such, the depicted edge connection SEC may be used in web-to-flange connections but also may be used in box connections, and the edge connection SEC generally may be located in wall studs, roof rafters, and floor joists.

Figure 15:
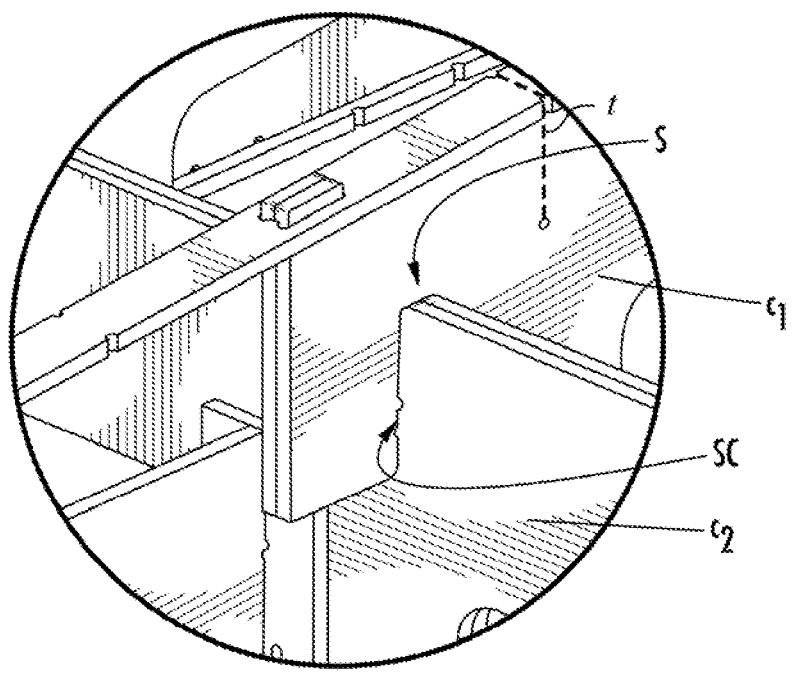
FIG. 15 is an illustration of a slot connection according to an exemplary embodiment of the present subject matter.

Turning to FIG. 15, one embodiment of a slot connection SC is shown. Slot connections SC may be used in perpendicular surface-to-surface connections. For example, as illustrated, a first component $c_1$ may define a slot s into which is received a second component $c_2$ that is oriented perpendicular to the first component $c_1$. Slot connections SC generally may be located at roof rafters, floor joists, and box girders.

Figure 16:
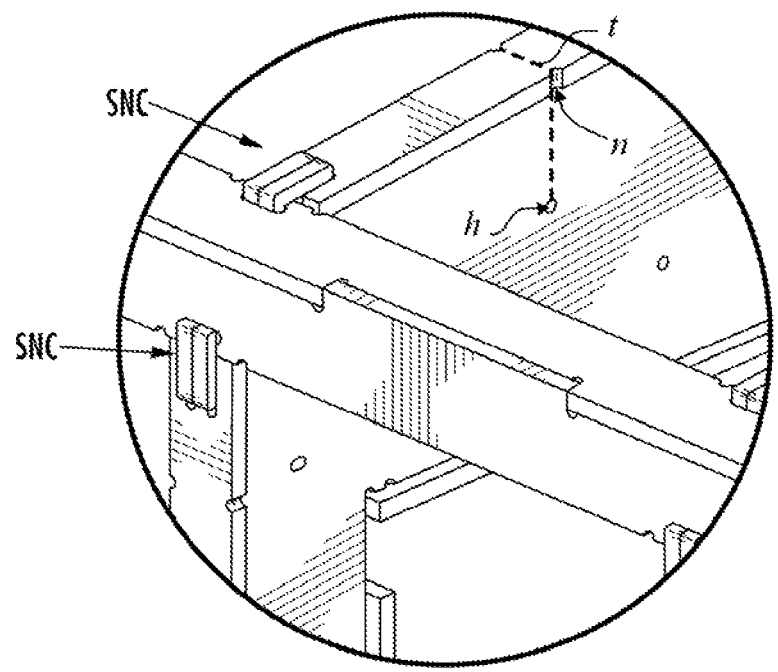
FIG. 16 is an illustration of a single notch connection according to an exemplary embodiment of the present subject matter.

FIG. 16 illustrates one embodiment of a single notch connection SNC. As shown, projections may fit within recesses of adjacent flanges to join the adjacent flanges. As such, the single notch connection SNC primarily may be used in flange-to-flange connections, as well as box connections. Single notch connections SNC generally are located at edge flanges and window boxes.

Figure 17:
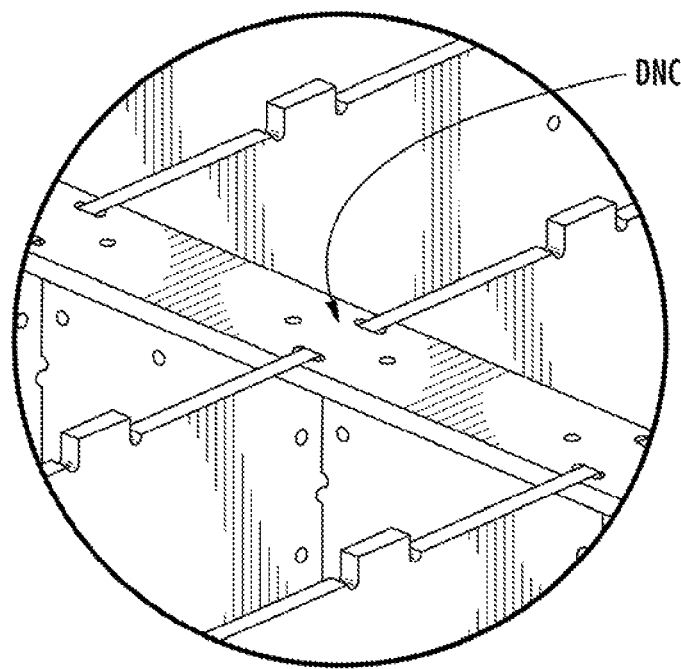
FIG. 17 is an illustration of a double notch connection according to an exemplary embodiment of the present subject matter.

FIG. 17 provides one embodiment of a double notch connection DNC. Double notch connections DNC primarily may be used in nogging connections in floor 100, which are described in more detail below. As illustrated in FIG. 17, floor nogging 110 defines a double notch to connection adjacent floor joists 102, which are positioned end-to-end. Accordingly, double notch connections DNC may most commonly be located at floor 100, between floor nogging 110 and joists 102.

Figure 18:
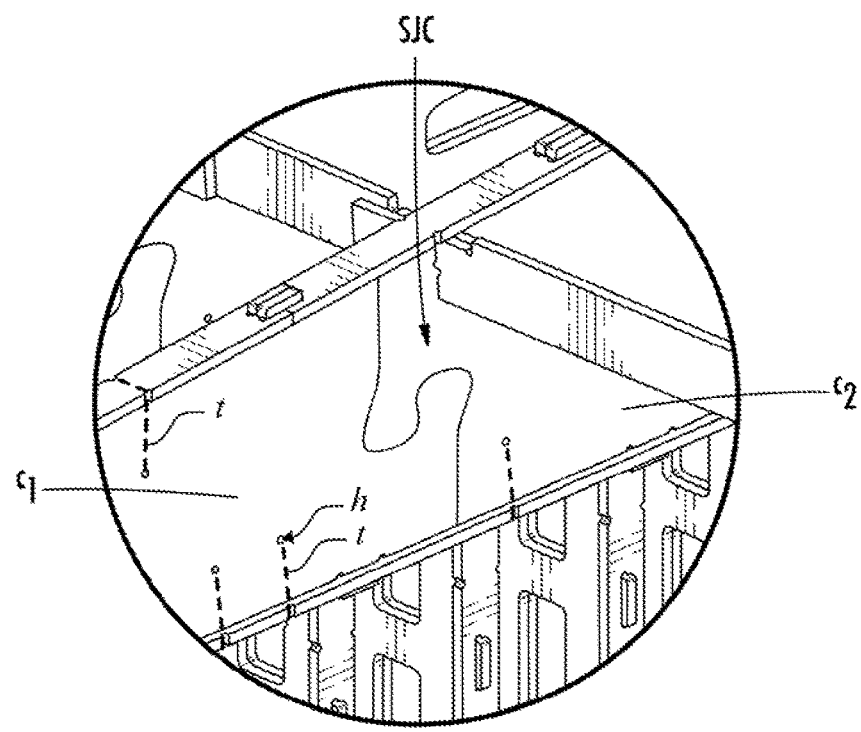
FIG. 18 is an illustration of a S-joint connection according to an exemplary embodiment of the present subject matter.

Referring now to FIG. 18, one embodiment of a S-joint connection SJC is illustrated. As previously described, S-joint connections SJC may be used to connect co-planar components such as roof webs 302. In exemplary embodiments, one half of the S-joint is defined by a first component $c_1$ and the other half of the S-joint is defined by a second component $c_2$. The two halves of the S-joint are joined together to join or attach the adjacent components $c_1$, $c_2$ end-to-end. S-joint connections SJC typically may be used as web-to-web or flange-to-flange connections, for connecting co-planar adjacent webs and co-planar adjacent flanges. Further, S-joint connections SJC generally may be located at roof rafters and leveling joists.

Figure 19:
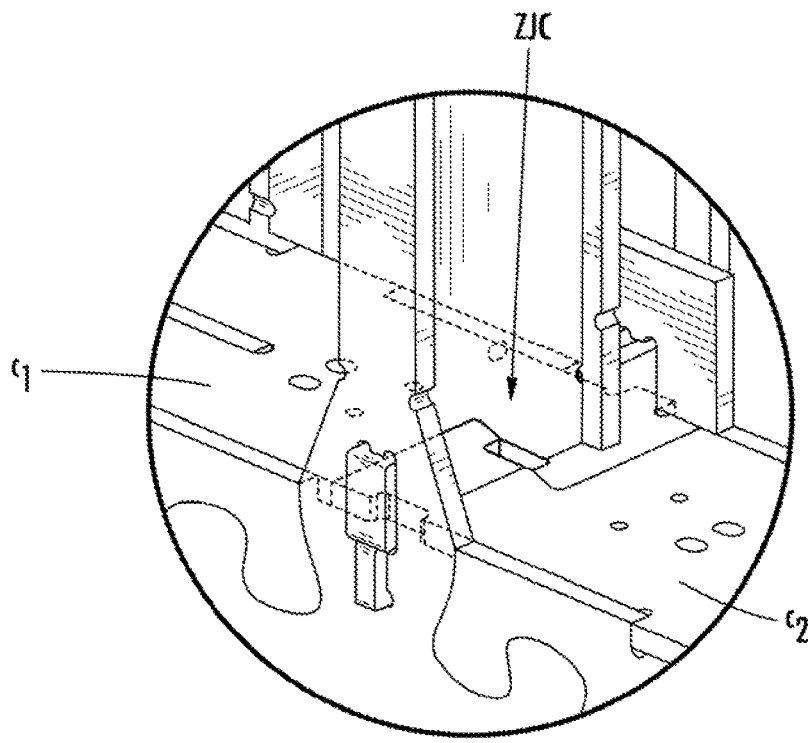
FIG. 19 is an illustration of a Z-joint connection according to an exemplary embodiment of the present subject matter.

FIG. 19 depicts one embodiment of a Z-joint connection ZJC. Z-joint connections ZJC may be used in horizontal web-to-web connections. For example, Z-joint connections ZJC may be used to join adjacent webs in wall headers. In exemplary embodiments, such as the embodiment shown in FIG. 19, one half of the Z-joint is defined by a first component $c_1$ and the other half of the Z-joint is defined by a second component $c_2$. The two halves of the Z-joint are joined together to join or attach the adjacent components $c_1$, $c_2$ end-to-end.

Figure 20:
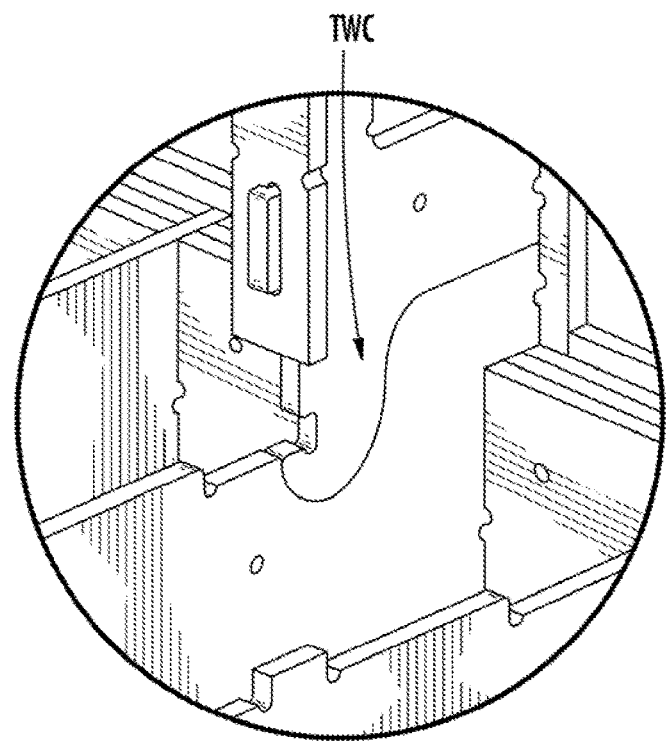
FIG. 20 is an illustration of a tilt-up wall connection according to an exemplary embodiment of the present subject matter.

Turning to FIG. 20, an illustration of one embodiment of a tilt-up wall connection TWC is provided. The tilt-up wall connection TWC is a horizontal-to-vertical connection primarily used to connect wall studs to floor joists. The rounded shape of the joint helps a wall section, which generally will comprise a plurality of studs 228 and other wall components, be tilted up and joined into place with respect to floor 100.

Figure 21:
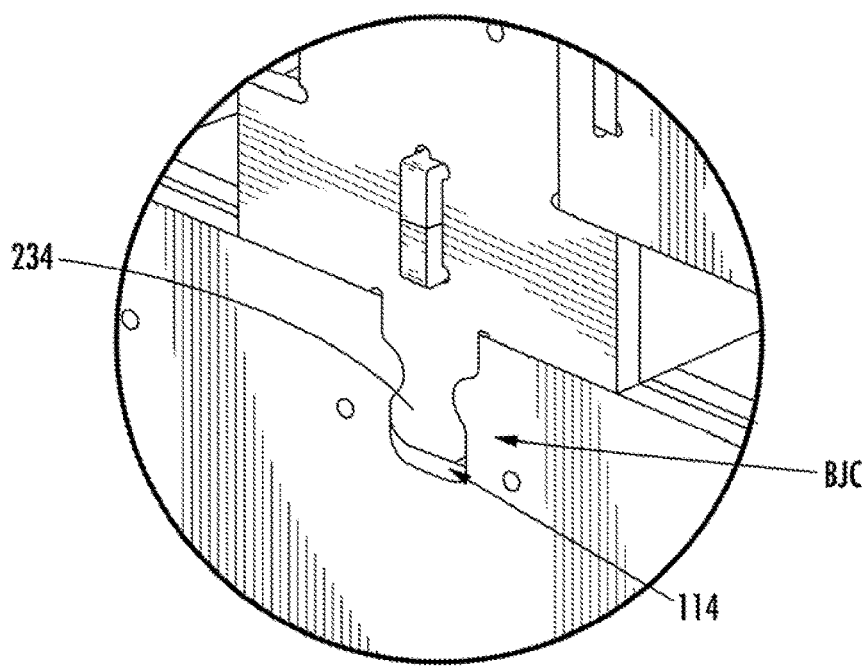
FIG. 21 is an illustration of a ball joint connection according to an exemplary embodiment of the present subject matter.
Figure 22:
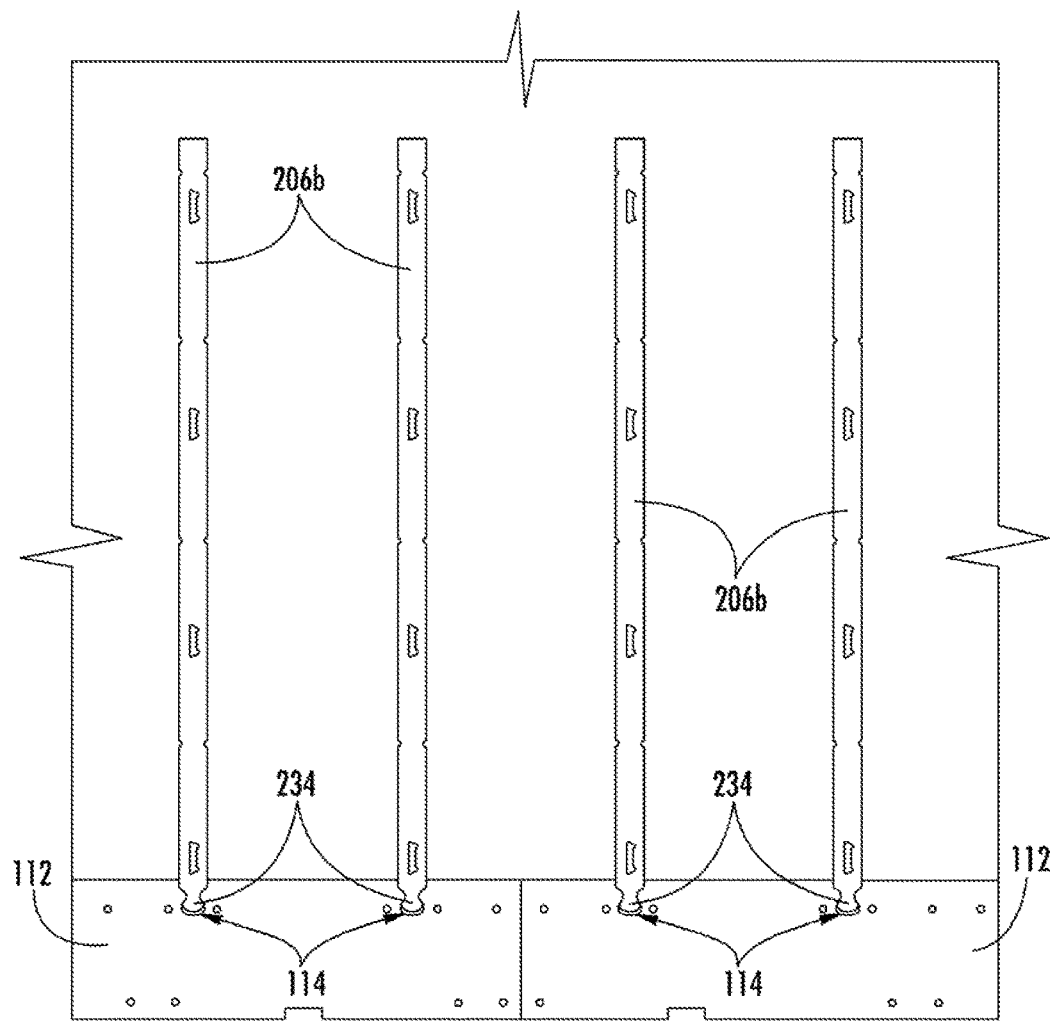
FIG. 22 is an illustration of wall flange components connected to floor rim joist components using the ball joint connection of FIG. 21.

FIGS. 21 and 22 illustrate one embodiment of a ball joint connection BJC. Ball joint connections BJC generally connect outer wall flanges 206b to a perimeter or rim joist 112 of floor 100, described in greater detail below. As shown most clearly in FIG. 21, outer flange 206b has a rounded tab 234 that fits within a cut-out 114 defined in rim joist 112. Such ball joint connections BJC provide resistance against uplift forces, e.g., caused by high winds or earthquakes. Further, the depicted ball joint connection BJC used in combination with the tilt-up wall connection TWC depicted in FIG. 20 helps the walls of wall system 200 securely stand on their own, without requiring temporary bracing to keep the walls in place with respect to floor 100 and to prevent the walls from tilting or falling.

Figure 23:
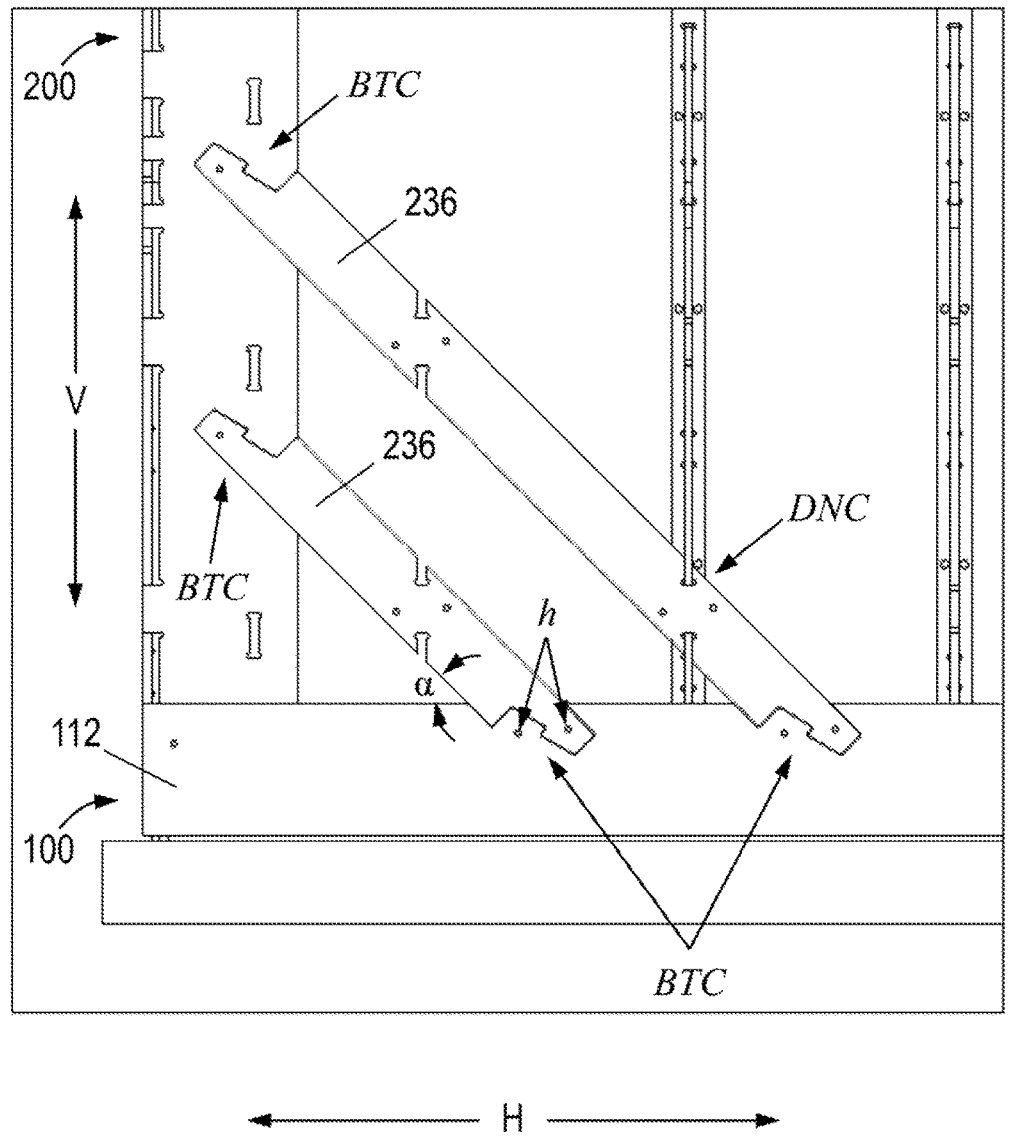
FIG. 23 is an illustration of a blunt tooth connection, as well as the double notch connection of FIG. 17, according to an exemplary embodiment of the present subject matter.
Figure 24:
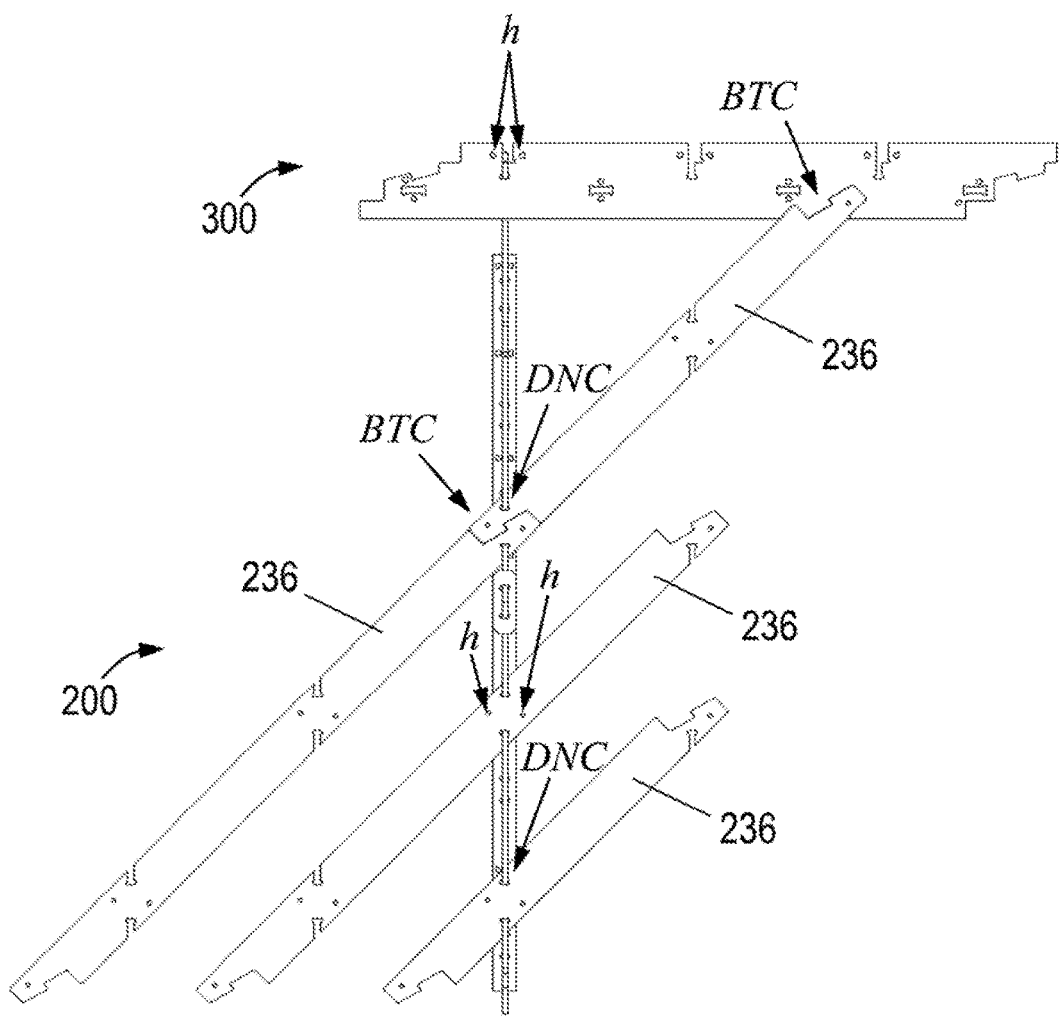
FIG. 24 is an illustration of brace members connected to one another and to a roof component using the blunt tooth connection of FIG. 23, as well as an illustration of brace member connected to a wall web component using the double notch connection of FIG. 17.
Figure 25:
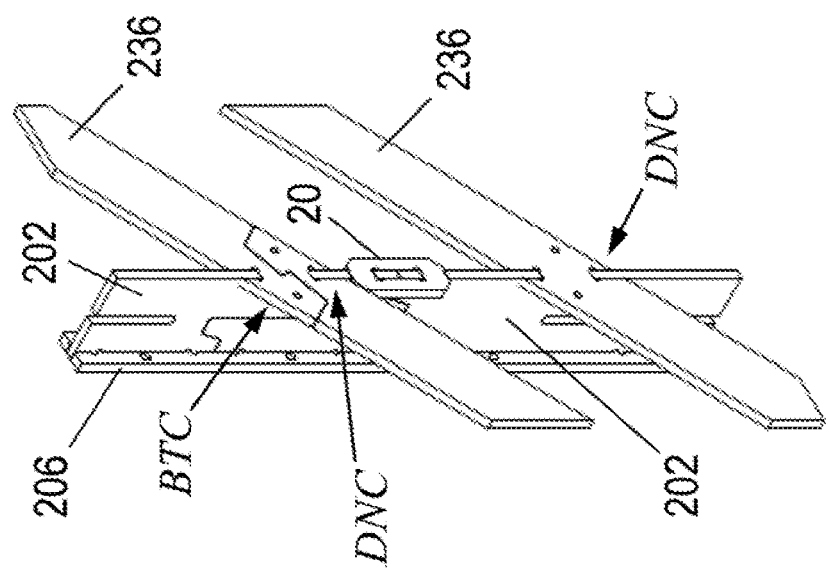
FIG. 25 is a further illustration of the brace members connected to one another and to the wall web component as shown in FIG. 24.

FIGS. 23-25 illustrate a blunt tooth connection BTC between framing system components, as well as a double notch connection DNC as described with respect to FIG. 17. As shown in FIGS. 23 and 24, blunt tooth connections BTC may be used between brace members 236, which reinforce sections of wall system 200, and wall components such as wall studs 228, floor components such as rim joists 112, and/or roof components such as rafters 330. In the embodiments illustrated in FIGS. 23 and 24, the brace members 236 extend between components generally at an angle $\alpha$ with respect to the horizontal direction H such that the brace members 236 generally extend at an angle with respect to other wall components. The angle $\alpha$ may be within a range of about 30° to about 60°, and in some embodiments, the angle $\alpha$ may be approximately 45°. Of course, other values of the angle $\alpha$ may be used as well.

Further, referring particularly to FIG. 24, the blunt tooth connection BTC also may be used at ends of brace members 236 to connect the brace members 236 to one another. Further, a double notch connection DNC may be defined at or near the blunt tooth connection BTC to connect the brace members 236 to components that are perpendicular widthwise to the brace members 236, e.g., to connect the brace members 236 to an edge 210, 212, 214, 216 of a wall web 202 or an edge 220, 222, 224, 226 of a wall flange 206. For instance, as illustrated in FIG. 25, a blunt tooth connection BTC may be used to connect two brace members 236 end-to-end, and a double notch connection in the area of the blunt tooth connection BTC connects the brace members 236 to an edge of two joined wall webs 202.

Figure 26:
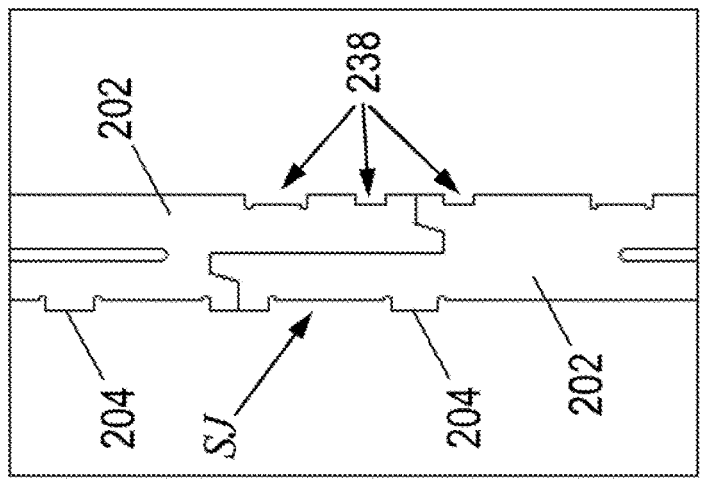
FIG. 26 is an illustration of a step joint according to an exemplary embodiment of the present subject matter.
Figure 27:
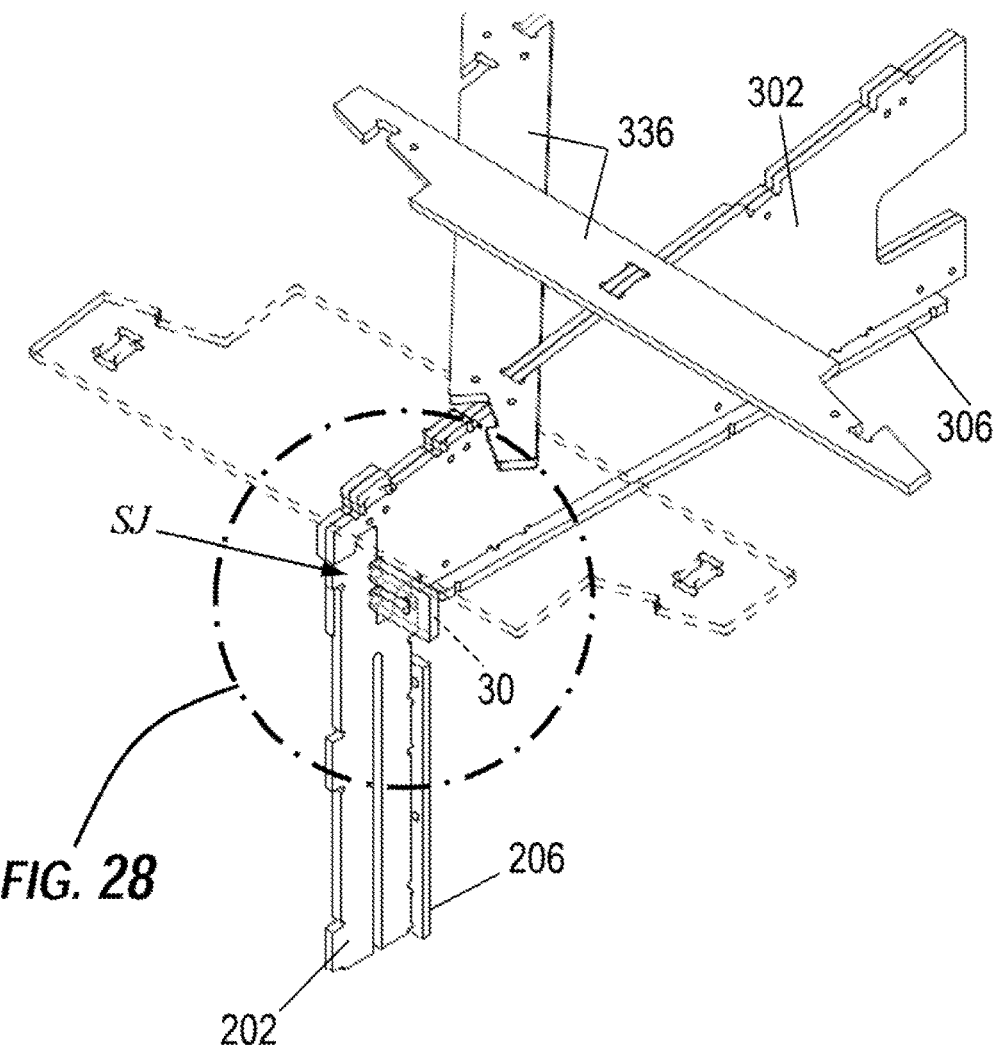
FIG. 27 is an illustration of a wall web component connected to a roof web component using the step joint of FIG. 26 and a key.
Figure 28:
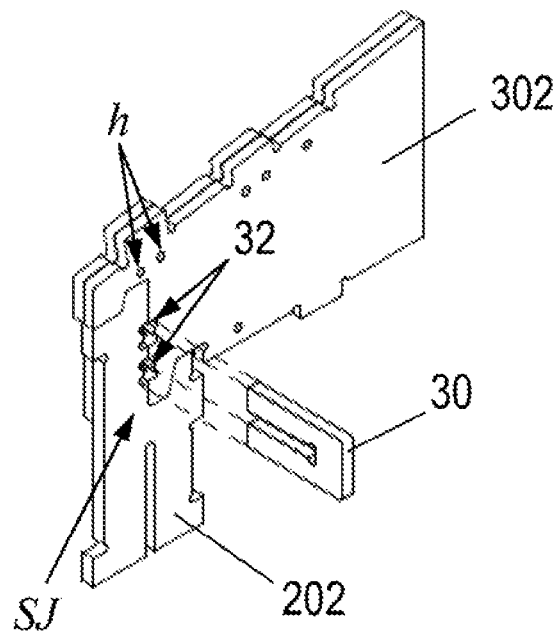
FIG. 28 is a close-up view of the step joint and key of FIG. 27.

Turning to FIGS. 26 through 28, an illustration is provided of embodiments of a step joint SJ. The step joint SJ is an end-to-end connection primarily used to connect wall webs 202, as shown in FIG. 26, or a wall web 202 and a roof web 302, as shown in FIGS. 27 and 28. Referring to FIGS. 25 and 26, the wall webs 202 also may define one or more notches or recesses 238 near the step joint SJ, e.g., for forming the double notch connection DNC between the joined wall webs 202 and the brace members 236 and/or for receipt of a connector 20 that helps connect the wall webs 202 to one another. FIGS. 27 and 28 illustrate a step joint SJ or step end connection between an end of a wall web 202 and an end of a roof web 302. As shown in FIG. 27, roof brace members 336 may be used, e.g., to help reinforce sections of roof system 300, and similar to wall brace members 236 illustrated in FIGS. 23 and 24, the roof brace members 336 may extend at angle with respect to other roof components. Additionally, as most clearly illustrated in FIG. 28, a key 30 inserted in apertures 32 defined by the wall web 202 and roof web 302 helps connect the wall and roof components.

Figure 29:
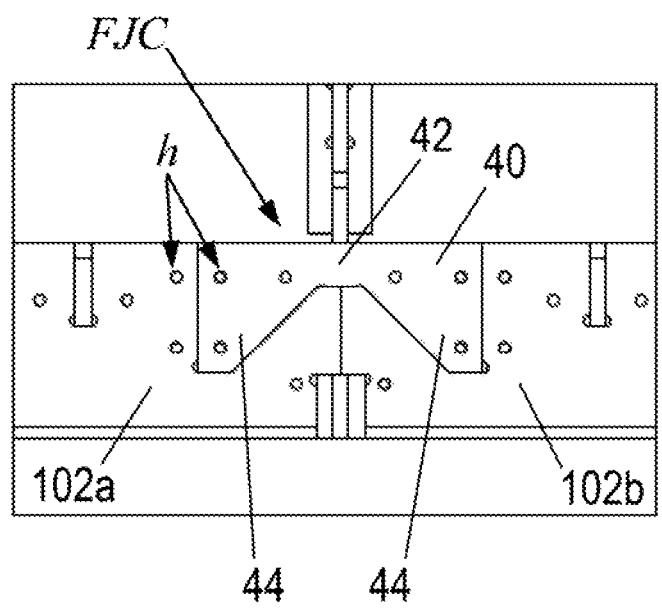
FIG. 29 is an illustration of a floor joist connection according to an exemplary embodiment of the present subject matter.
Figure 30:
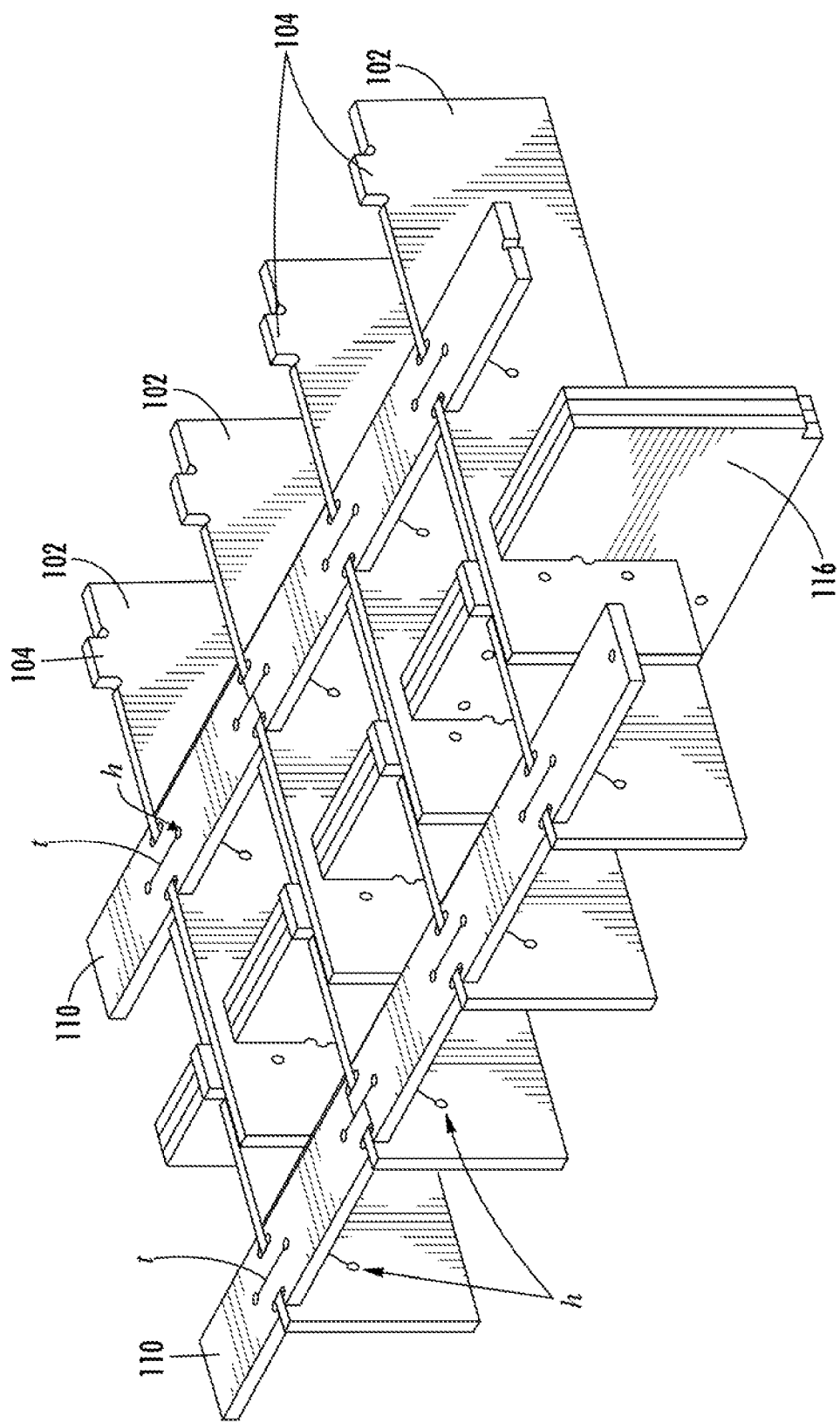
FIG. 30 is an illustration of a portion of a floor framing system according to an exemplary embodiment of the present subject matter.
Figure 31:
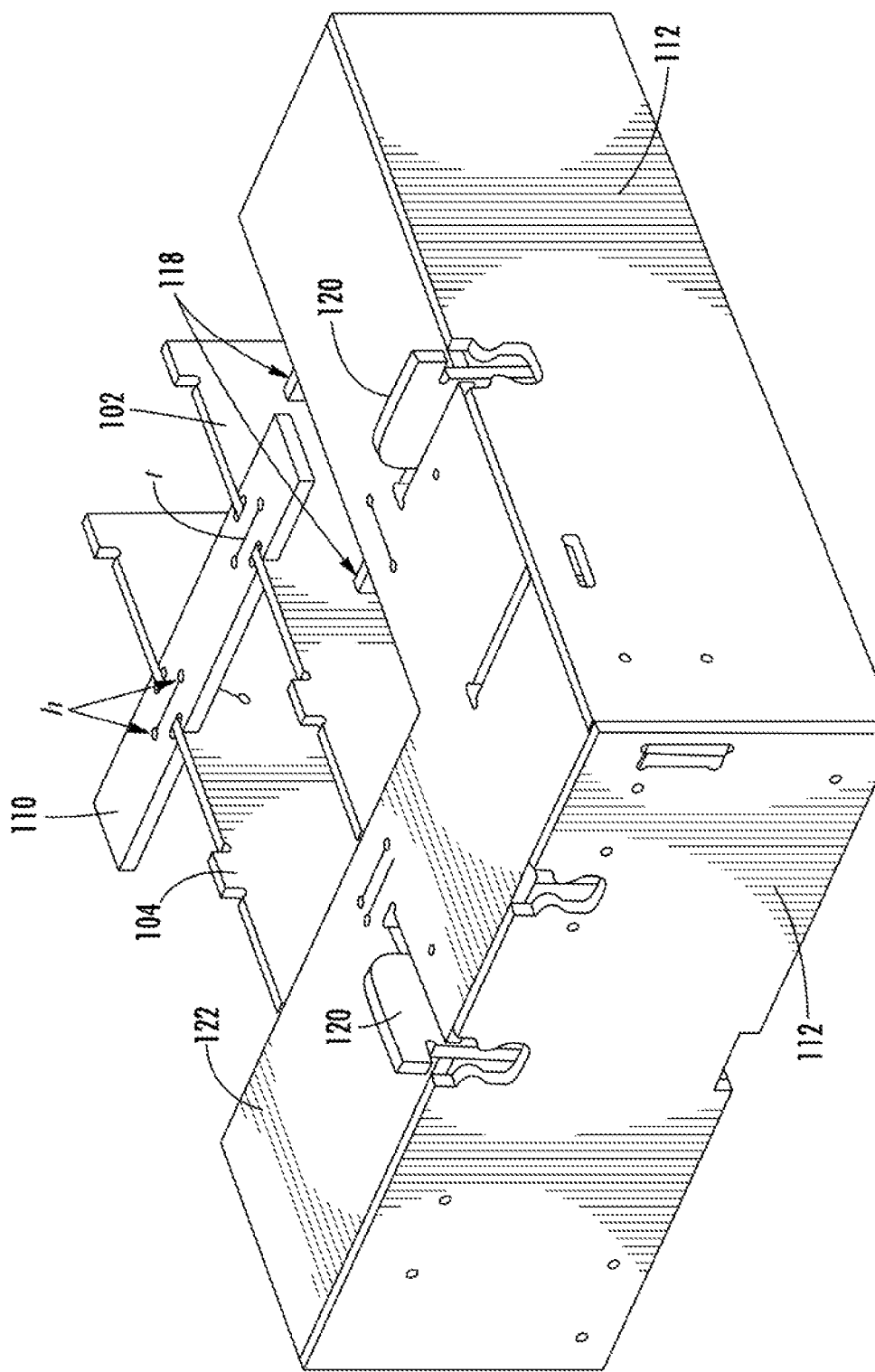
FIG. 31 is an illustration of another portion of a floor framing system according to an exemplary embodiment of the present subject matter.

Referring now to FIGS. 29, 30, and 31, additional details of floor framing system 100 will be described in more detail. FIG. 29 illustrates a floor joist connection FJC for connecting adjacent floor joists 102. As depicted in FIG. 29, a connector 40 spans the interface between adjacent ends 102*a* and 102*b* of the adjacent floor joists 102. The connector 40 generally comprises two truncated triangular portions 42 that are connected by a connection portion 44. Each triangular portion 42 fits within or is received within a complementary shaped recess in a respective floor joist end 102*a*, 102*b*. The connection portion 44 spans the interface between the floor joist ends 102*a*, 102*b*. Further, a plurality of holes h may be defined in each of the connector 40 and first and second ends 102*a*, 102*b*, and as previously described, a tie t may be passed through adjacent holes h and fastened to secure the connector 40 to the floor joist 102.

As shown in FIG. 30, in addition to floor joists 102 describe above, floor 100 may also include one or more leveling joists 116. Leveling joists 116 are positioned perpendicular to joists 102, and joists 102, 116 may be connected using a slot connection SC as described above with respect to FIG. 15. Further, floor nogging 110 may be connected to joists 102 using the double notch connection DNC described above with respect to FIG. 17. As shown, holes h may be defined in joists 102 and nogging 110 and ties t passed through holes h and fastened together to hold joists 102 and nogging 110 in place with respect to one another during construction of floor 100 and any additional systems, such as wall system 200 and roof system 300. As illustrated in FIG. 31, floor 100 further may include a plurality of small joists 118, end joists 120, and floor plates 122, as well as rim joists 112 as previously described. As shown, end joists 120 define a portion of the tilt-up wall connection joint TWC described with respect to FIG. 20.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A building framing system, comprising:
   a floor portion including
      a plurality of floor joist components, each floor joist component having a projection, and
      a plurality of subfloor components, each subfloor component defining a recess, wherein at least one of the subfloor components is adjacent one of the floor joist components such that the projection of the adjacent floor joist component fits within the recess of the subfloor component;
   a wall portion including
      a plurality of wall web components, each wall web component having a projection defined along an edge of the wall web component such that the projection extends from the edge, and
      a plurality of wall flange components, each wall flange component defining a recess, wherein at least one of the wall flange components is adjacent one of the wall web components such that the projection of the adjacent wall web component fits within the recess of the wall flange component such that the wall flange component is oriented perpendicular to the wall web component;
   a roof portion including
      a plurality of roof web components, each roof web component having a projection, and
      a plurality of roof flange components, each roof flange component defining a recess, wherein at least one of the roof flange components is adjacent one of the roof web components such that the projection of the adjacent roof web component fits within the recess of the roof flange component; and
   a plurality of tie components,
   wherein each tie component is positioned within a hole defined in each wall web component and a hole defined in each wall flange component, and
   wherein each tie component is fastened together such that each tie component encircles the wall web component to hold the wall web component and the wall flange component in place with respect to one another during assembly of the building framing system.

2. The building framing system of claim 1, wherein each tie component is a metal zip tie fastener.

3. The building framing system of claim 1, wherein at least one of the floor joist components defines a cut-out and one of the wall flange components adjacent the cut-out has a rounded tab that fits within the cut-out, and wherein a slot is defined between the rounded tab and a bottom of the cut-out.

4. A building framing system, comprising:
   a plurality of first components, each of the first components defining a first connection geometry;
   a plurality of second components, each of the second components defining a second connection geometry;
   a plurality of third components, each of the third components defining a third connection geometry; and
   a plurality of tie components,
   wherein each tie component is positioned within a notch defined in each first component and a notch defined in each second component,
   wherein each tie component is fastened together such that each tie component encircles at least one of the first component or the second component to hold the first component and the second component in place with respect to one another during assembly of the building framing system,
   wherein the first connection geometry joins with the second connection geometry to connect one of the first components with one of the second components that is adjacent the first component such that mechanical fasteners are not required to attach a first component to an adjacent second component,
   wherein each first component is oriented perpendicular to each second component, wherein each of the first components further defines a fourth connection geometry, the fourth connection geometry joining with the third connection geometry to connect one of the first components with one of the third components that is adjacent the first component such that mechanical fasteners are not required to attach a first component to an adjacent third component, and wherein each first component is oriented perpendicular to each third component.

5. The building framing system of claim 4, wherein the first connection geometry is pre-cut into each first component, and wherein the second connection geometry is pre-cut into each second component.

6. The building framing system of claim 4, wherein the first components and the second components are cut from at least one sheet of structural plywood.

7. The building framing system of claim 4, wherein each tie component is a metal zip tie fastener.

8. The building framing system of claim 4, wherein the first components are web components the first connection geometry is a projection, and wherein the second components are flange components and the second connection geometry is a recess.

9. The building framing system of claim 4, wherein the first components are floor joists and the first connection geometry is a slot, and wherein the second components are floor leveling joists and the second connection geometry is a portion of the second component perpendicular to the first component.

10. The building framing system of claim 4, wherein the first components are floor joists and the first connection geometry is a projection, and wherein the second components are subfloor components and the second connection geometry is a recess.

11. The building framing system of claim 4, wherein the first components are floor joists and the second components are floor noggings, and wherein the first connection geometry is a portion of the floor joists perpendicular to the floor noggings and the second connection geometry is a double notch.

12. A building framing system, comprising:
a plurality of first components, each of the first components defining a first connection geometry;
a plurality of second components, each of the second components defining a second connection geometry;
a plurality of third components, each of the third components defining a third connection geometry; and
a plurality of tie components,
wherein each tie component is positioned within a hole defined in each first component and a hole defined in each second component,
wherein each tie component is fastened together such that each tie component encircles at least one of the first component or the second component to hold the first component and the second component in place with respect to one another during assembly of the building framing system, and wherein each tie component is a metal zip tie fastener, wherein the first connection geometry joins with the second connection geometry to connect one of the first components with one of the second components that is adjacent the first component such that mechanical fasteners are not required to attach one of the first components to an adjacent one of the second components, wherein each of the first components further defines a fourth connection geometry, the fourth connection geometry joining with the third connection geometry to connect one of the first components with one of the third components that is adjacent the first component such that mechanical fasteners are not required to attach one of the first components to an adjacent one of the third components, and wherein each first component is oriented perpendicular to each third component.

13. The building framing system of claim 12, wherein each of the second components further defines a fifth connection geometry, the fifth connection geometry joining with the third connection geometry to connect one of the second components with one of the third components that is adjacent the second component such that mechanical fasteners are not required to attach one of the second components to an adjacent one of the third components, and wherein each second component is oriented perpendicular to each third component.

14. The building framing system of claim 12, wherein the first components are roof web components and the first connection geometry is a half S-joint, and wherein the second components are roof web components and the second connection geometry is a half S-joint.

15. The building framing system of claim 12, wherein the first components are wall web components and the first connection geometry is a half Z-joint, and wherein the second components are wall web components and the second connection geometry is a half Z-joint.

16. The building framing system of claim 12, wherein the first components are wall web components and the second components are floor end joist components, and wherein the first and the second connection geometries are rounded to facilitate tilting the wall web components into place with respect to the floor end joists.

17. The building framing system of claim 12, wherein the first components are wall flange components and the first connection geometry is a rounded tab, and wherein the second components are floor rim joist components and the second connection geometry is a cut-out corresponding to the rounded tab.

* * * * *